(12) United States Patent
Wiegand

(10) Patent No.: US 8,958,509 B1
(45) Date of Patent: Feb. 17, 2015

(54) SYSTEM FOR SENSOR SENSITIVITY ENHANCEMENT AND METHOD THEREFORE

(71) Applicant: Richard J. Wiegand, Millersville, MD (US)

(72) Inventor: Richard J. Wiegand, Millersville, MD (US)

( * ) Notice: Subject to any disclaimer, the term of this patent is extended or adjusted under 35 U.S.C. 154(b) by 150 days.

(21) Appl. No.: 13/742,809

(22) Filed: Jan. 16, 2013

(51) Int. Cl.
*H04B 1/10* (2006.01)

(52) U.S. Cl.
CPC ........................................ *H04B 1/10* (2013.01)
USPC ............................ 375/346; 375/316; 375/219

(58) Field of Classification Search
USPC .......................................... 375/346, 316, 219
See application file for complete search history.

(56) References Cited

U.S. PATENT DOCUMENTS

| | | | |
|---|---|---|---|
| 5,133,017 | A | 7/1992 | Cain et al. |
| 6,205,421 | B1 | 3/2001 | Morii |
| 6,384,951 | B1 | 5/2002 | Basiji et al. |
| 6,978,159 | B2 | 12/2005 | Feng et al. |
| 7,236,534 | B1 | 6/2007 | Morejon et al. |
| 7,454,010 | B1 | 11/2008 | Ebenezer |
| 7,529,422 | B2 | 5/2009 | Wang et al. |
| 7,840,088 | B2 | 11/2010 | Huang et al. |
| 7,965,834 | B2 | 6/2011 | Alves et al. |
| 2002/0048333 | A1* | 4/2002 | Ahmed et al. ................. 375/346 |
| 2002/0177995 | A1 | 11/2002 | Walker |
| 2006/0217970 | A1 | 9/2006 | Sukkar et al. |
| 2009/0226005 | A1 | 9/2009 | Acero et al. |
| 2009/0259439 | A1* | 10/2009 | Feldhaus et al. ............... 702/191 |
| 2009/0263001 | A1 | 10/2009 | Ding et al. |
| 2009/0271187 | A1 | 10/2009 | Yen et al. |
| 2009/0304203 | A1 | 12/2009 | Haykin et al. |
| 2011/0158419 | A1 | 6/2011 | Theverapperuma et al. |

FOREIGN PATENT DOCUMENTS

WO 2009/081002 A1 7/2009

* cited by examiner

*Primary Examiner* — Zewdu Kassa
(74) *Attorney, Agent, or Firm* — Rosenberg, Klein & Lee

(57) ABSTRACT

A sensor system is provided having a front end (81) and a digital signal processing unit (82) adapted for providing sensitivity enhancement. The front end (81) includes a sensor (10) whose output signal is digitized (11) and coupled to the digital signal processing unit (82). The digital signal processing unit (82) has a matched filter function to measure the signal's energy with minimum statistical error energy caused by white noise. The digital signal processing unit (82) also includes a matrix digital signal processor (12) that linearly utilizes the white noise values in the input's wider band spectrum to further suppress the white noise statistical error energy in the matched filter, to enhance the system sensitivity. The digital signal processing unit (82) also includes mode digital signal processors (13) to combine multiple event inputs in a manner that further improves sensitivity over extended time periods.

34 Claims, 27 Drawing Sheets

|     | A | B | C | D | E | F | G | H | I | J | K | L | M |
|---|---|---|---|---|---|---|---|---|---|---|---|---|---|
| 156 | | | | | | | | | | | | | |
| 157 | The signals plus noise net input TD waveform | | | | | | | | | | | | |
| 158 | Time | 0.00 | 0.13 | 0.25 | 0.38 | 0.50 | 0.63 | 0.75 | 0.88 | | | | |
| 159 | Count | 0 | 1 | 2 | 3 | 4 | 5 | 6 | 7 | | Energy | RMS vltg | |
| 160 | Real (Volts) | 0.18 | 0.12 | 0.44 | −0.28 | 2.08 | −0.72 | −1.38 | −0.46 | | Joules | Volts | |
| 161 | Imaginary (Volts) | 0.49 | −1.99 | 0.03 | −0.02 | 0.24 | 0.06 | −0.94 | −0.95 | | 1.67 | 1.29 | |
| 162 | Magnitude (Volts) | 0.53 | 1.99 | 0.44 | 0.28 | 2.10 | 0.72 | 1.67 | 1.06 | | 2.22 | | Energy(dB) |
| 163 | Phase (degrees) | 69.76 | 273.32 | 4.23 | 184.05 | 6.62 | 175.19 | 214.15 | 244.02 | | | | |
| 164 | | | | | | | | | | | | | |
| 165 | The conventional TD to FD transform of the above TD waveform | | | | | | | Row number= | | 0 | | | |
| 166 | Frequency | 0.00 | 1.00 | 2.00 | 3.00 | 4.00 | 5.00 | 6.00 | 7.00 | | | | |
| 167 | Count | 0 | 1 | 2 | 3 | 4 | 5 | 6 | 7 | | Energy | RMS vltg | |
| 168 | Real (Volts) | 0.00 | −0.16 | 0.28 | −0.52 | 0.33 | −0.08 | 0.52 | −0.20 | | Joules | Volts | |
| 169 | Imaginary (Volts) | −0.38 | −0.55 | 0.19 | 0.43 | 0.34 | 0.16 | 0.22 | 0.09 | | 1.67 | 1.29 | |
| 170 | Magnitude (Volts) | 0.38 | 0.57 | 0.34 | 0.67 | 0.48 | 0.17 | 0.57 | 0.22 | | 2.22 | | Energy(dB) |
| 171 | Phase (degrees) | 269.49 | 253.97 | 33.62 | 139.99 | 45.63 | 115.63 | 23.18 | 157.15 | | | | |
| 172 | | | | | | | | | | | | | |

FIG. 4A

Nominal white noise energy 1.00 Joules

Designated cell net input
| Component | Value |
|---|---|
| Frequency | 1.00 |
| Count | 1 |
| Real (Volts) | −0.16 |
| Imaginary (Volts) | −0.55 |
| Magnitude (Volts) | 0.57 |
| Phase (degrees) | 253.97 |

Designated cell signal input
| Component | Value | | Energy Joules | Energy dB | Relative Energy dB |
|---|---|---|---|---|---|
| Frequency | 1.00 | | | | |
| Count | 1 | | | | |
| Real (Volts) | 0.36 | | 0.25 | −6.03 | 3.00 |
| Imaginary (Volts) | −0.35 | | | | |
| Magnitude (Volts) | 0.50 | | | | |
| Phase (degrees) | 315.53 | | | | |

| | A | B | C | D | E | F | G | H | I | J | K | L | M |
|---|---|---|---|---|---|---|---|---|---|---|---|---|---|
| 173 | | | The transform of the net TD input to the 8x8 CDxFD Matrix | | | | | | | | | | |
| 174 | | | Real component | | | | | | | | | | |
| 175 | | Freq → | 0.00 | 1.00 | 2.00 | 3.00 | 4.00 | 5.00 | 6.00 | 7.00 | Voltage | | |
| 176 | Code | Row\Col | 0 | 1 | 2 | 3 | 4 | 5 | 6 | 7 | Sum | | |
| 177 | 0 | 0 | 0.00 | -0.16 | 0.28 | -0.52 | 0.33 | -0.08 | 0.52 | -0.20 | 0.18 | | |
| 178 | 30 | 1 | -0.38 | 0.19 | -0.15 | 0.20 | -0.55 | 0.60 | 0.13 | 0.14 | 0.18 | | |
| 179 | 45 | 2 | -0.14 | 0.41 | -0.09 | 0.66 | 0.12 | -0.07 | -0.84 | 0.13 | 0.18 | | |
| 180 | 51 | 3 | 0.38 | -0.18 | 0.53 | 0.24 | 0.42 | -0.53 | -0.20 | -0.47 | 0.18 | | |
| 181 | 71 | 4 | 0.04 | 0.03 | 0.65 | -0.33 | 0.07 | -0.28 | 0.38 | -0.37 | 0.18 | | |
| 182 | 89 | 5 | -0.26 | 0.49 | 0.01 | 0.26 | -0.45 | 0.32 | -0.24 | 0.06 | 0.18 | | |
| 183 | 106 | 6 | -0.17 | 0.03 | -0.71 | 0.00 | -0.07 | 0.29 | 0.00 | 0.81 | 0.18 | | |
| 184 | 116 | 7 | 0.71 | -0.64 | -0.32 | -0.34 | 0.31 | -0.06 | 0.43 | 0.09 | 0.18 | | |
| 185 | V SUM | | 0.18 | 0.18 | 0.18 | 0.18 | 0.18 | 0.18 | 0.18 | 0.18 | 1.46 | | |
| 186 | | | | | | | | | | | | | |
| 187 | | | The transform of the net TD input to the 8x8 CDxFD Matrix | | | | | | | | | | |
| 188 | | | Magnitude component | | | | | | | | | | |
| 189 | | Freq → | 0.00 | 1.00 | 2.00 | 3.00 | 4.00 | 5.00 | 6.00 | 7.00 | Voltage | | |
| 190 | Code | Row\Col | 0 | 1 | 2 | 3 | 4 | 5 | 6 | 7 | Sum | FD | ENERGY |
| 191 | 0 | 0 | 0.38 | 0.57 | 0.34 | 0.67 | 0.48 | 0.17 | 0.57 | 0.22 | 0.53 | | 1.67 |
| 192 | 30 | 1 | 0.60 | 0.35 | 0.15 | 0.50 | 0.62 | 0.65 | 0.31 | 0.14 | 0.53 | | 1.67 |
| 193 | 45 | 2 | 0.32 | 0.45 | 0.09 | 0.70 | 0.12 | 0.26 | 0.85 | 0.22 | 0.53 | | 1.67 |
| 194 | 51 | 3 | 0.50 | 0.45 | 0.56 | 0.33 | 0.43 | 0.54 | 0.25 | 0.49 | 0.53 | | 1.67 |
| 195 | 71 | 4 | 0.35 | 0.13 | 0.76 | 0.36 | 0.41 | 0.41 | 0.38 | 0.57 | 0.53 | | 1.67 |
| 196 | 89 | 5 | 0.38 | 0.56 | 0.09 | 0.33 | 0.63 | 0.63 | 0.31 | 0.45 | 0.53 | | 1.67 |
| 197 | 106 | 6 | 0.17 | 0.22 | 0.71 | 0.05 | 0.28 | 0.51 | 0.18 | 0.84 | 0.53 | | 1.67 |
| 198 | 116 | 7 | 0.71 | 0.65 | 0.32 | 0.35 | 0.47 | 0.18 | 0.43 | 0.26 | 0.53 | | 1.67 |
| 199 | Voltage Sum → | | 0.53 | 0.53 | 0.53 | 0.53 | 0.53 | 0.53 | 0.53 | 0.53 | 4.21 | | 13.33 |
| 200 | FD Energy → | | 1.67 | 1.67 | 1.67 | 1.67 | 1.67 | 1.67 | 1.67 | 1.67 | 13.33 | Sum | |
| 201 | | | | | | | | | | | | | |

| | N | O | P | Q | R | S | T | U | V | W | X | Y |
|---|---|---|---|---|---|---|---|---|---|---|---|---|
| 173 | | The transform of the net TD input to the 8x8 CDxFD Matrix imaginary component | | | | | | | | | | |
| 174 | | | | | | | | | | | | |
| 175 | Freq→ | 0.00 | 1.00 | 2.00 | 3.00 | 4.00 | 5.00 | 6.00 | 7.00 | Voltage | | |
| 176 | Row\Col | 0 | 1 | 2 | 3 | 4 | 5 | 6 | 7 | sum | | |
| 177 | 0 | -0.38 | -0.55 | 0.19 | 0.43 | 0.34 | 0.16 | 0.22 | 0.09 | 0.49 | | |
| 178 | 1 | -0.46 | -0.29 | 0.03 | 0.45 | 0.28 | 0.24 | 0.28 | -0.03 | 0.49 | | |
| 179 | 2 | 0.29 | 0.18 | -0.01 | -0.23 | 0.01 | 0.24 | -0.17 | 0.18 | 0.49 | | |
| 180 | 3 | 0.32 | 0.42 | -0.19 | -0.24 | 0.09 | 0.10 | 0.15 | -0.15 | 0.49 | | |
| 181 | 4 | 0.35 | 0.13 | 0.41 | -0.14 | -0.41 | -0.30 | 0.02 | 0.44 | 0.49 | | |
| 182 | 5 | 0.28 | 0.27 | 0.09 | 0.19 | -0.44 | -0.54 | 0.20 | 0.45 | 0.49 | | |
| 183 | 6 | 0.02 | 0.22 | 0.02 | -0.05 | 0.27 | 0.42 | -0.18 | -0.22 | 0.49 | | |
| 184 | 7 | 0.08 | 0.13 | -0.04 | 0.07 | 0.35 | 0.17 | -0.02 | -0.24 | 0.49 | | |
| 185 | Voltage Sum | 0.49 | 0.49 | 0.49 | 0.49 | 0.49 | 0.49 | 0.49 | 0.49 | 3.95 | | |
| 186 | | | | | | | | | | | | |
| 187 | | The transform of the net TD input to the 8x8 CDxFD Matrix Phase component | | | | | | | | | | |
| 188 | | | | | | | | | | | | |
| 189 | Freq→ | 0.00 | 1.00 | 2.00 | 3.00 | 4.00 | 5.00 | 6.00 | 7.00 | Voltage | | |
| 190 | Row\Col | 0 | 1 | 2 | 3 | 4 | 5 | 6 | 7 | sum | | |
| 191 | 0 | 269.49 | 253.97 | 33.62 | 139.99 | 45.63 | 115.63 | 23.18 | 157.15 | 69.76 | | |
| 192 | 1 | 230.31 | 303.11 | 170.08 | 65.73 | 152.66 | 22.03 | 65.07 | 346.19 | 69.76 | | |
| 193 | 2 | 115.03 | 23.02 | 184.88 | 340.92 | 6.24 | 106.69 | 191.57 | 54.39 | 69.76 | | |
| 194 | 3 | 40.30 | 113.99 | 340.22 | 314.90 | 11.49 | 169.14 | 143.20 | 198.25 | 69.76 | | |
| 195 | 4 | 82.64 | 75.69 | 32.45 | 202.95 | 279.30 | 226.94 | 2.41 | 130.09 | 69.76 | | |
| 196 | 5 | 133.11 | 28.83 | 86.68 | 35.94 | 224.07 | 300.30 | 141.07 | 82.49 | 69.76 | | |
| 197 | 6 | 173.47 | 80.87 | 178.71 | 267.60 | 103.90 | 55.61 | 270.48 | 344.61 | 69.76 | | |
| 198 | 7 | 6.30 | 168.51 | 187.10 | 168.22 | 48.03 | 109.79 | 357.57 | 290.39 | 69.76 | | |
| 199 | Voltage Sum | 69.76 | 69.76 | 69.76 | 69.76 | 69.76 | 69.76 | 69.76 | 69.76 | | | |
| 200 | | | | | | | | | | | | |
| 201 | | | | | | | | | | | | |

|     | A | B | C | D | E | F | G | H | I | J | K | L | M |
|-----|---|---|---|---|---|---|---|---|---|---|---|---|---|
| 156 | The signals plus noise net input TD waveform | | | | | | | | | | | | |
| 157 | Time | 0.00 | 0.13 | 0.25 | 0.38 | 0.50 | 0.63 | 0.75 | 0.88 | | | | |
| 158 | Count | 0 | 1 | 2 | 3 | 4 | 5 | 6 | 7 | | | | |
| 159 | Real (Volts) | 1.00 | 0.70 | 0.00 | -0.70 | -1.00 | -0.70 | 0.00 | 0.70 | | Energy | RMS vltg | |
| 160 | Imaginary (Volts) | 0.00 | 0.70 | 1.00 | 0.70 | 0.00 | -0.70 | -1.00 | -0.70 | | Joules | Volts | |
| 161 | Magnitude (Volts) | 1.00 | 1.00 | 1.00 | 1.00 | 1.00 | 1.00 | 1.00 | 1.00 | | 0.99 | 1.00 | |
| 162 | Phase (Degrees) | 0.00 | 45.00 | 90.00 | 135.00 | 180.00 | 225.00 | 270.00 | 315.00 | | -0.03 ⟶ Energy(dB) | | |
| 163 | | | | | | | | | | | | | |
| 164 | The conventional TD to FD transform of the above TD waveform | | | | | | | Row number= | 0 | | | | |
| 165 | Frequency | 0.00 | 1.00 | 2.00 | 3.00 | 4.00 | 5.00 | 6.00 | 7.00 | | | | |
| 166 | Count | 0 | 1 | 2 | 3 | 4 | 5 | 6 | 7 | | | | |
| 167 | Real (Volts) | 0.00 | 0.00 | 0.00 | 0.00 | 0.00 | 0.00 | 0.00 | 0.00 | | Energy | RMS vltg | |
| 168 | Imaginary (Volts) | 0.00 | 0.00 | 0.00 | 0.00 | 0.00 | 0.00 | 0.00 | 0.00 | | Joules | Volts | |
| 169 | Magnitude (Volts) | 0.00 | 1.00 | 0.00 | 0.00 | 0.00 | 0.00 | 0.00 | 0.00 | | 0.99 | 0.35 | |
| 170 | Phase (Degrees) | 0.00 | 0.00 | 0.00 | 0.00 | 0.00 | 0.00 | 0.00 | 0.00 | | -0.03 ⟶ Energy(dB) | | |
| 171 | | | | | | | | | | | | | |

FIG. 5A

|     | N | O | P | Q | R | S | T | U | V | W | X | Y |
|-----|---|---|---|---|---|---|---|---|---|---|---|---|
| 156 |   |   |   |   |   |   |   |   |   |   |   |   |
| 157 |   |   |   |   |   |   |   |   |   |   |   |   |
| 158 |   | Nominal white noise energy 0.00 Joules | | | | | | | | | | |
| 159 |   |   |   |   |   |   |   |   |   |   |   |   |
| 160 |   | Designated cell net input | | | | | Designated cell signal input | | | | | |
| 161 |   | Component | | | Value | | Component | | Value | | | |
| 162 |   |   |   |   |   |   |   |   |   |   |   |   |
| 163 |   | Frequency Count | | | 1.00 | | Frequency Count | | 1.00 | | | |
| 164 |   |   |   |   | 1 | |   |   | 1 | | | |
| 165 |   |   |   |   |   |   |   |   |   | Energy Joules | Energy dB | Relative Energy dB |
| 166 |   | Real (Volts) | | | 1.00 | | Real (Volts) | | 1.00 | | | |
| 167 |   | Imaginary (Volts) | | | 0.00 | | Imaginary (Volts) | | 0.00 | 0.99 | −0.03 | 9.00 |
| 168 |   | Magnitude (Volts) | | | 1.00 | | Magnitude (Volts) | | 1.00 | | | |
| 169 |   | Phase (degrees) | | | 0.00 | | Phase (degrees) | | 0.00 | | | |
| 170 |   |   |   |   |   |   |   |   |   |   |   |   |
| 171 |   |   |   |   |   |   |   |   |   |   |   |   |
| 172 |   |   |   |   |   |   |   |   |   |   |   |   |

FIG. 5B

| | A | B | C | D | E | F | G | H | I | J | K | L | M |
|---|---|---|---|---|---|---|---|---|---|---|---|---|---|
| 173 | | | | | | | | | | | | | |
| 174 | | | The transform of the net TD input to the 8x8 CDxFD Matrix | | | | | | | | | | |
| 175 | | | Real component | | | | | | | | | | |
| 176 | | Freq → | 0.00 | 1.00 | 2.00 | 3.00 | 4.00 | 5.00 | 6.00 | 7.00 | Voltage | | |
| | Code | Row\Col | 0 | 1 | 2 | 3 | 4 | 5 | 6 | 7 | Sum | | |
| 177 | 0 | 0 | 0.00 | 1.00 | 0.00 | 0.00 | 0.00 | 0.00 | 0.00 | 0.00 | 1.00 | | |
| 178 | 30 | 1 | 0.60 | 0.00 | 0.60 | 0.00 | -0.10 | 0.00 | -0.10 | 0.00 | 1.00 | | |
| 179 | 45 | 2 | 0.25 | 0.00 | 0.25 | 0.00 | 0.25 | 0.00 | 0.25 | 0.00 | 1.00 | | |
| 180 | 51 | 3 | 0.00 | 0.00 | 0.00 | 0.50 | 0.00 | 0.00 | 0.00 | 0.50 | 1.00 | | |
| 181 | 71 | 4 | -0.18 | 0.00 | -0.18 | 0.25 | 0.18 | 0.50 | 0.18 | 0.25 | 1.00 | | |
| 182 | 89 | 5 | 0.07 | 0.00 | 0.07 | -0.25 | 0.43 | 0.50 | 0.43 | -0.25 | 1.00 | | |
| 183 | 106 | 6 | 0.07 | 0.00 | 0.07 | 0.25 | 0.43 | -0.50 | 0.43 | 0.25 | 1.00 | | |
| 184 | 116 | 7 | 0.18 | 0.00 | 0.18 | 0.25 | -0.18 | 0.50 | -0.18 | 0.25 | 1.00 | | |
| 185 | | V SUM → | 1.00 | 1.00 | 1.00 | 1.00 | 1.00 | 1.00 | 1.00 | 1.00 | 7.97 | | |
| 186 | | | | | | | | | | | | | |
| 187 | | | The transform of the net TD input to the 8x8 CDxFD Matrix | | | | | | | | | | |
| 188 | | | Magnitude component | | | | | | | | | | |
| 189 | | Freq → | 0.00 | 1.00 | 2.00 | 3.00 | 4.00 | 5.00 | 6.00 | 7.00 | Voltage | | |
| 190 | Code | Row\Col | 0 | 1 | 2 | 3 | 4 | 5 | 6 | 7 | Sum | FD | ENERGY |
| 191 | 0 | 0 | 0.00 | 1.00 | 0.00 | 0.00 | 0.00 | 0.00 | 0.00 | 0.00 | 1.00 | | 0.99 |
| 192 | 30 | 1 | 0.65 | 0.00 | 0.65 | 0.00 | 0.27 | 0.00 | 0.27 | 0.00 | 1.00 | | 0.99 |
| 193 | 45 | 2 | 0.27 | 0.00 | 0.27 | 0.00 | 0.65 | 0.00 | 0.65 | 0.00 | 1.00 | | 0.99 |
| 194 | 51 | 3 | 0.00 | 0.00 | 0.00 | 0.70 | 0.00 | 0.00 | 0.00 | 0.70 | 1.00 | | 0.99 |
| 195 | 71 | 4 | 0.46 | 0.00 | 0.46 | 0.35 | 0.19 | 0.50 | 0.19 | 0.35 | 1.00 | | 0.99 |
| 196 | 89 | 5 | 0.19 | 0.00 | 0.19 | 0.35 | 0.46 | 0.50 | 0.46 | 0.35 | 1.00 | | 0.99 |
| 197 | 106 | 6 | 0.19 | 0.00 | 0.19 | 0.35 | 0.46 | 0.50 | 0.46 | 0.35 | 1.00 | | 0.99 |
| 198 | 116 | 7 | 0.46 | 0.00 | 0.46 | 0.35 | 0.19 | 0.50 | 0.19 | 0.35 | 1.00 | | 0.99 |
| 199 | Voltage Sum → | | 1.00 | 1.00 | 1.00 | 1.00 | 1.00 | 1.00 | 1.00 | 1.00 | 7.97 | 7.94 | |
| 200 | FD Energy → | | 0.99 | 0.99 | 0.99 | 0.99 | 0.99 | 0.99 | 0.99 | 0.99 | Sum | | |
| 201 | | | | | | | | | | | | | |

| | N | O | P | Q | R | S | T | U | V | W | X | Y | Z |
|---|---|---|---|---|---|---|---|---|---|---|---|---|---|
| 173 | | The transform of the net TD input to the 8x8 CDxFD Matrix | | | | | | | | | | | |
| 174 | | imaginary component | | | | | | | | | | | |
| 175 | Freq → | 0.00 | 1.00 | 2.00 | 3.00 | 4.00 | 5.00 | 6.00 | 7.00 | Voltage | | | |
| 176 | Row\Col | 0 | 1 | 2 | 3 | 4 | 5 | 6 | 7 | sum | | | |
| 177 | 0 | 0.00 | 0.00 | 0.00 | 0.00 | 0.00 | 0.00 | 0.00 | 0.00 | 0.00 | | | |
| 178 | 1 | −0.25 | 0.00 | 0.25 | 0.00 | −0.25 | 0.00 | 0.25 | 0.00 | 0.00 | | | |
| 179 | 2 | −0.10 | 0.00 | 0.10 | 0.50 | 0.60 | 0.00 | −0.60 | 0.00 | 0.00 | | | |
| 180 | 3 | 0.00 | 0.00 | 0.00 | −0.25 | 0.00 | 0.00 | 0.00 | −0.50 | 0.00 | | | |
| 181 | 4 | −0.43 | 0.00 | 0.43 | 0.25 | −0.07 | 0.00 | 0.07 | 0.25 | 0.00 | | | |
| 182 | 5 | 0.18 | 0.00 | −0.18 | −0.25 | −0.18 | 0.00 | 0.18 | −0.25 | 0.00 | | | |
| 183 | 6 | 0.18 | 0.00 | −0.18 | −0.25 | −0.18 | 0.00 | 0.18 | 0.25 | 0.00 | | | |
| 184 | 7 | 0.43 | 0.00 | −0.43 | −0.25 | 0.07 | 0.00 | −0.07 | 0.25 | 0.00 | | | |
| 185 | Voltage | | | | | | | | | | | | |
| 186 | Sum | 0.00 | 0.00 | 0.00 | 0.00 | 0.00 | 0.00 | 0.00 | 0.00 | | | | |
| 187 | | The transform of the net TD input to the 8x8 CDxFD Matrix | | | | | | | | | | | |
| 188 | | Phase component | | | | | | | | | | | |
| 189 | Freq → | 0.00 | 1.00 | 2.00 | 3.00 | 4.00 | 5.00 | 6.00 | 7.00 | Voltage | | | |
| 190 | Row\Col | 0 | 1 | 2 | 3 | 4 | 5 | 6 | 7 | sum | | | |
| 191 | 0 | 0.00 | 0.00 | 0.00 | 0.00 | 0.00 | 0.00 | 0.00 | 0.00 | 0.00 | | | |
| 192 | 1 | 337.50 | 0.00 | 22.50 | 0.00 | 247.50 | 0.00 | 112.50 | 0.00 | 360.00 | | | |
| 193 | 2 | 337.50 | 0.00 | 22.50 | 0.00 | 67.50 | 0.00 | 292.50 | 0.00 | 0.00 | | | |
| 194 | 3 | 0.00 | 0.00 | 0.00 | 45.00 | 0.00 | 0.00 | 0.00 | 315.00 | 360.00 | | | |
| 195 | 4 | 247.50 | 0.00 | 112.50 | 315.00 | 337.50 | 0.00 | 22.50 | 45.00 | 0.00 | | | |
| 196 | 5 | 67.50 | 0.00 | 292.50 | 135.00 | 337.50 | 0.00 | 22.50 | 225.00 | 360.00 | | | |
| 197 | 6 | 67.50 | 0.00 | 292.50 | 315.00 | 337.50 | 180.00 | 22.50 | 45.00 | 0.00 | | | |
| 198 | 7 | 67.50 | 0.00 | 292.50 | 315.00 | 157.50 | 0.00 | 202.50 | 45.00 | 360.00 | | | |
| 199 | Voltage | | | | | | | | | | | | |
| 200 | Sum | 0.00 | 360.00 | 0.00 | 0.00 | 0.00 | 0.00 | 0.00 | 0.00 | | | | |
| 201 | | | | | | | | | | | | | |

|     | A | B | C | D | E | F | G | H | I | J | K | L | M | N | O |
|-----|---|---|---|---|---|---|---|---|---|---|---|---|---|---|---|
| 439 | Description | | Units | | The individual input detection results for the output | | | | | | | | | | |
| 440 | | | | | | | | | | | | | | | |
| 441 | Threshold | | dB | -21.00 | -20.00 | -19.00 | -18.00 | -17.00 | -16.00 | -15.00 | -14.00 | -13.00 | -12.00 | -11.00 | -10.00 |
| 442 | Detection | | NA | 1 | 1 | 1 | 1 | 1 | 1 | 1 | 1 | 1 | 1 | 1 | 1 |
| 443 | Detection count | | NA | 50 | 50 | 50 | 50 | 50 | 50 | 50 | 50 | 50 | 50 | 50 | 49 |
| 444 | Detection rate | | percent | 78.13 | 78.13 | 78.13 | 78.13 | 78.13 | 78.13 | 78.13 | 78.13 | 78.13 | 78.13 | 78.13 | 76.56 |
| 445 | Area under curve | | dB | -3.33 | Registered value dB | | | -3.33 | | | | | | | |
| 446 | | | | | | | | | | | | | | | |

|     | P | Q | R | S | T | U | V | W | X | Y | Z | AA | AB | AC | AD |
|-----|---|---|---|---|---|---|---|---|---|---|---|----|----|----|----|
| 439 | | | | | | | | | | | | | | | |
| 440 | | | | | | | | | | | | | | | |
| 441 | -9.00 | -8.00 | -7.00 | -6.00 | -5.00 | -4.00 | -3.00 | -2.00 | -1.00 | 0.00 | 1.00 | 2.00 | 3.00 | 4.00 | 5.00 |
| 442 | 1 | 1 | 1 | 1 | 1 | 1 | 1 | 1 | 1 | 1 | 1 | 1 | 1 | 1 | 1 |
| 443 | 49 | 49 | 48 | 48 | 46 | 45 | 45 | 42 | 40 | 36 | 34 | 31 | 24 | 18 | 14 |
| 444 | 76.56 | 76.56 | 75.00 | 75.00 | 71.88 | 70.31 | 70.31 | 65.63 | 62.50 | 56.25 | 53.13 | 48.44 | 37.50 | 28.13 | 21.88 |
| 445 | | | | | | | | | | | | | | | |
| 446 | | | | | | | | | | | | | | | |

|     | AE | AF | AG | AH | AI | AJ | AK | AL | AM | AN | AO | AP | AQ | AR | AS | AT |
|-----|----|----|----|----|----|----|----|----|----|----|----|----|----|----|----|----|
| 439 | | | | | | | | | | | | | | | | |
| 440 | | | | | | | | | | | | | | | | |
| 441 | 6.00 | 7.00 | 8.00 | 9.00 | 10.00 | 11.00 | 12.00 | 13.00 | 14.00 | 15.00 | 16.00 | 17.00 | 18.00 | 19.00 | 20.00 | 21.00 |
| 442 | 0 | 0 | 0 | 0 | 0 | 0 | 0 | 0 | 0 | 0 | 0 | 0 | 0 | 0 | 0 | 0 |
| 443 | 10 | 10 | 5 | 1 | 1 | 00 | 00 | 00 | 00 | 00 | 00 | 00 | 00 | 00 | 00 | 00 |
| 444 | 15.63 | 15.63 | 7.81 | 1.56 | 1.56 | 0.00 | 0.00 | 0.00 | 0.00 | 0.00 | 0.00 | 0.00 | 0.00 | 0.00 | 0.00 | 0.00 |
| 445 | | | | | | | | | | | | | | | | |
| 446 | | | | | | | | | | | | | | | | |

FIG. 7A

SYSTEM FOR SENSOR SENSITIVITY ENHANCEMENT AND METHOD THEREFORE

BACKGROUND OF THE INVENTION

1. Field of the Invention

A sensor system and method are provided having a digital signal processing unit adapted for providing sensitivity enhancement. Sensitivity enhancement is provided by attenuating white noise within a frequency band corresponding to a signal of interest utilizing the white noise that is distributed in a frequency spectrum outside the frequency band that corresponds to a signal of interest. In particular, the system and method make use of a matrix digital signal processor to convert a digital signal, the digital signal being representative of a signal output from a sensor, from a single event time domain signal with N time domain samples to N frequency domain samples, where N is an integer greater than 1. The N frequency domain samples represent a frequency spectrum at least N times greater than what is typically referred to as the "matched filter bandwidth" of the signal output from the sensor. The energy of a multi-event signal (i.e. multiple N sample inputs) is obtained by coupling the output of the matrix digital signal processor to a mode digital signal processor. The mode digital signal processor computes an average signal energy over an extended time period of multiple signal energy values output by the matrix digital signal processor.

2. Prior Art

The sensitivity of sensors, including radio frequency receivers, is defined as the ability to detect or perceive a given phenomenon, condition or level and one major limitation thereof is naturally occurring white noise. The power of this noise within the sensor or receiver reception bandwidth is given by the well-known formula:

$$W=KTFBG;$$

where, "W" is the nominal or average noise power, "K" is Boltzmann's Constant, "T" is the absolute temperature, "F" is the noise figure, "B" is the reception bandwidth and "G" is the gain.

Those knowledgeable in the art, including the inventor, consider single input event sensitivity enhancement attempts that use non-linear signal processing as being ineffective at enhancing sensitivity for most applications.

The prior art generally linearly optimizes the sensitivity of receivers and sensor systems by placing a preamplifier as early in the reception chain of circuit elements as practical and by using a preamplifier with a gain that is sufficiently large that the noise figure of subsequent circuits is effectively irrelevant. Further, a high quality preamplifier is used that has a small noise figure. The final conventional linear method of optimizing sensitivity is to match the reception bandwidth to the signal bandwidth in order provide an optimum signal to noise ratio (SNR). Another method of optimizing sensitivity, although in most cases somewhat impractical, is to cool (significantly) the preamplifier and other front-end hardware. This is usually accomplished with either a special refrigeration system or by immersion into a bath of liquid nitrogen.

It is has been widely believed that it was not possible to use linear signal processing to attenuate the white noise without simultaneously attenuating the signal. When the input consists of multiple time domain samples that are transformed to frequency domain samples or cells, and the width of what we designate as the designated cell is equal the bandwidth of the desired signal, practitioners of the prior art have assumed that the noise visible outside the designated cell is of no use in assessing the noise in the designated cell.

However, in contrast to the prior art, the inventor has been found that it is possible to linearly attenuate the noise in the designated cell without attenuating the desired signal. The noise values in the remaining frequency domain cells are determined and used to attenuate the noise component in the designated cell using a matrix digital processing system and method.

SUMMARY OF THE INVENTION

A system for enhancing sensitivity of a sensor system is provided. The system includes a front end circuit having an input receiving a signal representing a sensing parameter combined with white noise and outputting an electrical signal corresponding thereto. The front end circuit has a frequency bandwidth N times a matched filter bandwidth for the sensing parameter to be detected by the front end circuit, where N is greater than one. The system further includes a digital signal processing unit coupled to the front end circuit for filtering the electrical signal as a plurality of frequency domain cells. The digital signal processing unit defines one of the plurality of frequency domain cells as a designated cell. The designated cell has a center frequency and bandwidth matched to the desired signal. The other of the plurality of frequency domain cells are frequency domain cells outside the matched filter bandwidth, where the other of the plurality of frequency domain cells are processed to obtain an estimate of white noise energy in the designated cell.

From another aspect, a system for enhancing sensitivity of a sensor system is provided. The system includes a front end circuit having an input receiving a signal representing a sensing parameter combined with white noise and outputting an electrical signal corresponding thereto. The system further includes an analog-to-digital converter receiving the electrical signal and outputting a digital representation of the electrical signal as N sequential samples, where N is an integer greater than one. Further, the system includes a digital signal processing unit coupled to the analog-to-digital converter. The digital signal processing unit includes a matrix digital signal processor for applying a transform to the N sequential samples using matrix of $N^2$ cells. One of the cells is a designated cell with center frequency and bandwidth matched to the signal representing the sensing parameter combined with white noise. Energy of the white noise is distributed in the designated cell and a plurality of other of the cells in row zero of the matrix. The matrix digital signal processor uses the white noise distributed in the plurality of those other cells to compensate for energy of the white noise within the designated cell to provide a filtered output signal at an output of the matrix digital signal processor representing an energy value of the sensing parameter.

From still another aspect, a system for enhancing sensitivity of a receiver system is provided. The system includes a front end circuit having an antenna coupled to input thereof receiving white noise and a carrier signal modulated by an information signal and outputting a demodulated electrical signal corresponding to the information signal and white noise. The front end circuit has a frequency bandwidth N times a matched filter bandwidth for the demodulated electrical signal, where N is greater than one. Further, the system includes a digital signal processing unit coupled to the front end circuit for filtering a digital representation of the demodulated electrical signal as a plurality of frequency domain cells. The digital representation of the demodulated signal is input to the digital signal processing unit as N sequential digital samples. The digital signal processing unit defines one of the plurality of frequency domain cells as a designated cell. The designated cell has a frequency bandwidth equal to a frequency bandwidth of the signal's carrier. The other of the plurality of frequency domain cells includes frequency domain cells outside the matched filter bandwidth, and the other of the plurality of frequency domain cells are processed to obtain an improved estimate of signal energy in the designated cell. When a signal is not present, the designated cell's measured energy is reduced compared to the conventional processing's measurement of the matched filter's white noise energy.

From yet another aspect, a method of enhancing sensitivity of a sensor system is provided. The method includes the step of providing a sensor system having a frequency bandwidth N times a matched filter bandwidth for an input signal to be detected by the sensor system, where N is greater than one. The method also includes the step of sensing the input signal and white noise at an input of the sensor system and providing an electrical signal representation thereof at an output of the sensor system. Further, the method includes the step of providing a digital signal processor to filter the electrical signal representation as a plurality of frequency domain cells. The digital signal processor defines one of the plurality of frequency domain cells as a designated cell. The designated cell has a frequency bandwidth equal to a frequency bandwidth of the input signal. The method further includes the step of processing the other of the plurality of frequency domain cells to obtain an estimate of the signal energy in the designated cell in a manner that effectively attenuates the white noise. The other of the plurality of frequency domain cells includes frequency domain cells outside the matched filter bandwidth. Still further, the method includes the step of compensating for the white noise in the designated cell using the white noise values in the other of the plurality of frequency domain cells.

From a still further aspect, a method of enhancing sensitivity of a sensor system is provided. The method includes the steps of sensing a sensing parameter combined with white noise and conversion thereof to an electrical signal, and converting the electrical signal in an analog-to-digital converter to a digital representation thereof as N sequential samples, where N is an integer greater than one. Further, the method includes the step of filtering at least a portion of the white noise from the digital representation of the electrical signal to provide a signal representing the sensing parameter in a digital signal processing unit. The step of filtering includes applying a transform to the N sequential samples for converting the samples to an N×N matrix. The step of filtering further includes processing the matrix to calculate the (vector) voltages of the white noise external to a bandwidth of the sensing parameter and using the calculated white noise (vector) voltages to compensate for energy of the white noise within the bandwidth of the sensing parameter.

BRIEF DESCRIPTION OF THE DRAWINGS

FIGS. 4A and 4B present exemplary data and results for the matrix digital signal processor and the Fourier transform digital signal processor;

FIGS. 4C and 4D present exemplary data and results for the matrix digital signal processor;

FIGS. 5A, 5B, 5C and 5D present exemplary calibration data for the matrix digital signal processor where N=8;

FIG. 7A is a presentation of exemplary data and results for mode 2 processing;

DESCRIPTION OF THE PREFERRED EMBODIMENT

Figure 1A:
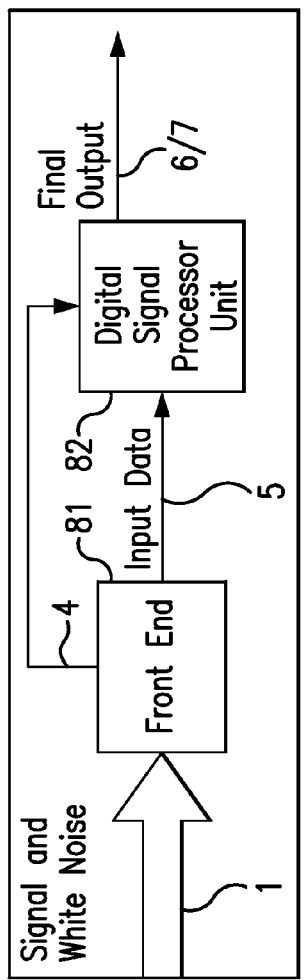
FIG. 1A is a high level block diagram for the sensitivity enhancement system of the present invention.
Figure 1B:
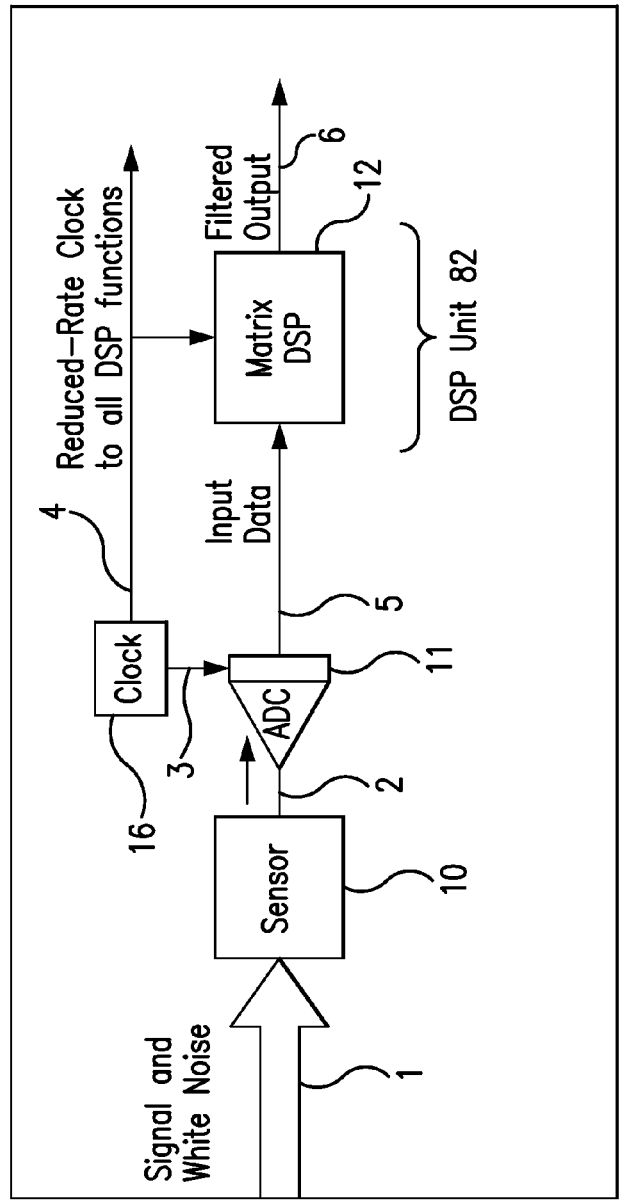
FIG. 1B is a block diagram illustrating an implementation of the present invention.

Referring to FIGS. 1A and 1B, there is shown high-level diagrams illustrating a basic arrangement of a sensor system providing sensitivity enhancement and having a digital signal processing unit (DSP unit) adapted for that purpose. In broad concept, as presented in FIG. 1A, the sensor system includes a front end 81 which receives a signal or stimulus that in the real world includes some level of noise, defined as an unwanted random addition to a signal. The sensor system further includes a DSP unit 82 coupled to the front end 81 for providing a high quality representation of the sensor output.

The input 1 to front end 81 is sensing parameter, which may be energy (mechanical, electrical, optical, etc.) representing a signal (time-varying or spatial-varying quantity) or may be a stimulus (a physical property being measured), and white noise. The sensing parameter that is input can be a velocity or acceleration; a body's orientation (e.g., roll, pitch and/or yaw); flow rate; displacement of an object or material; pressure; temperature or heat; mechanical vibration including those considered to be acoustic; electrical; magnetic; electromagnetic (including radio frequency, laser and other light propagations); or a variety of other possible things to be measured at a given frequency, along with its accompanying undesired white noise. The front end 81 can be considered an analog signal processor, including an analog sensor and possibly one or more stages of amplification, and sampling and associated circuitry that converts the analog input into an N quadrature data value set (or a 2N data value set for a single sideband sampler) of digital data that is placed on the output bus 5 that couples the front end 81 to the input of the DSP unit 82. Thus, while the exemplary systems described herein define the front end as including a digitizing function, that function can be just as well be a separate functional element of the system or incorporated in the digital signal processing portion of the system, all without departing from the inventive concepts presented herein.

To provide the improved sensitivity of the disclosed exemplary systems and methods, there are two constraints on the system. These constraints are described in the frequency domain as follows. The first constraint is that the frequency of the signal of interest be matched to the designated cell center frequency. The input bandwidth of the sensor of front end 81 can be thought of as being divided into a number of cells or bins as a function of the sampling frequency of front end 81. The convention being used here is that a group of "N" time-domain samples is taken at the sampling rate (quantization) as input and processed as a "single event," without regard to the past or future history of the data, where this time domain data, consisting of two N components 90 degrees out of phase with one another, is transformed (using digital signal processing) into N frequency domain spectral lines or cells and the vector in the one designated cell is considered the (filtered) signal plus noise value. The sampling rate is at least the Nyquist rate. The bandwidth of the designated cell is the single event reception bandwidth, typically the "matched filter bandwidth." For electromagnetic input signals, such as radio frequency (RF) signals, the designated cell has a center frequency corresponding to the signal's carrier frequency by definition. Thus the designated cell defines, in the frequency domain, that portion of the spectral bandwidth of the front end that is centered on the bandwidth of the signal of interest. The designated cell has the same properties of a conventional N sample time to frequency transform, where the remaining cells are conventionally discarded because they contain no signal energy, only noise energy.

Figure 12:
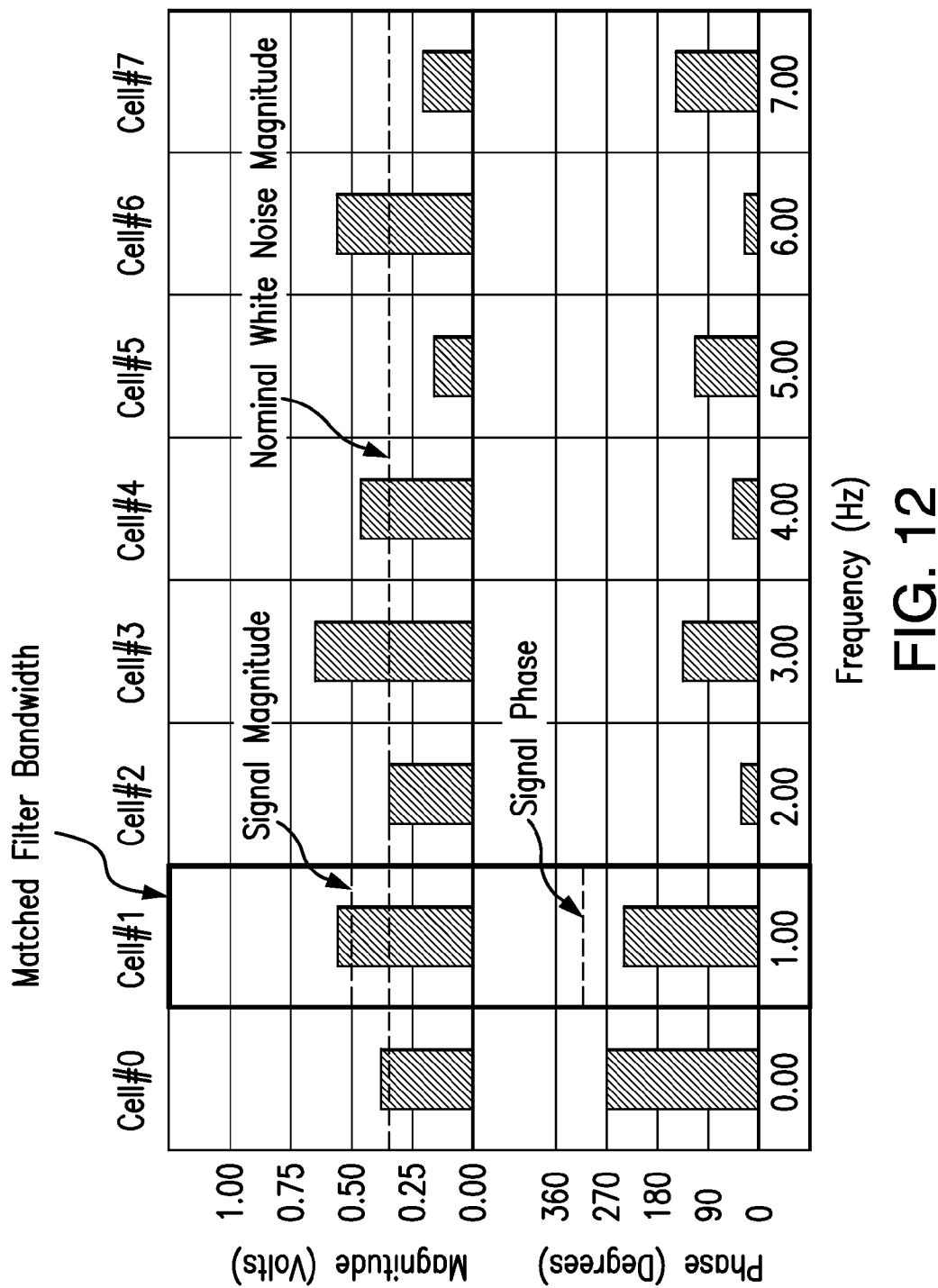
FIG. 12 is an exemplary graphical representation of frequency domain cells for an eight-sample single-event input.

For all practical purposes, the designated cell contains all of the waveform energy of a single input event signal, while the white noise energy is distributed among all of the frequency domain cells. The average white noise energy in each cell, including the designated cell, is equal. However, the noise energy distribution among the frequency domain cells for a given input event is usually quite unequal as shown by the cell-to-cell magnitude variations for an example eight-sample single-event input in FIG. 12. As used herein a "single event" time length, which is sometimes referred to in the art as the matched filter time interval, is defined as the reciprocal of the bandwidth for a theoretical matched filter that would be used in the front end to optimize the reception sensitivity, from the perspective of signal to noise ratio, thereof.

The other constraint is that the gain of the front end be flat across the bandwidth, including the designated cell, that is N times the designated cell bandwidth, where "N" is a key processing parameter, typically being 8 or 64, corresponding to the number of samples taken. In the quadrature-sampling convention, the number of time domain samples and the number of frequency domain samples are both equal to N, in accord with the Nyquist Limit (sampling frequency being at least twice the highest frequency of the signal being sampled).

Although the gain flatness across the band of front end 81 ensures that the noise can be characterized as white noise, that constraint is not a critical parameter. Under conditions where the front end 81 has unacceptable gain variations that are unavoidable, for whatever reason, such unacceptable a priori variations can be compensated for in the DSP unit 82 by well-known digital processing techniques.

The bus 5 transfers the digitized input data to the DSP unit 82, where it is processed to ascertain a measure of the white noise outside the designated cell and use that measure to increase the signal sensitivity in the designated cell. The processed data is then output from DSP unit 82 on bus 6 (for a single event processing) or bus 7 (for multiple event processing), as will be described in following paragraphs.

A more detailed illustration of a typical implementation of front end 81 and DSP unit 82 is shown in FIG. 1B. However, while some applications may need additional frequency-shift circuitry included as well, such is not important to the sensitivity enhancement systems and methods provided herein. The frequency alignment, bandwidth and gain constraints of front end 81, as discussed above, are embodied in the specification constraints of the sensor 10, the analog to digital converter (ADC) 11 and the clock 16. The matrix DSP processing of DSP unit 82 is carried out in the Matrix DSP 12.

As previously discussed, the sensor 10 has characteristics that are appropriate for the particular phenomenon being sensed. For example, the sensor 10 may be a microphone for sensing acoustic signals, an antenna for sensing RF signals, or a piezoelectric device for sensing mechanical vibrational signals. Sensor 10 converts the input phenomenon into an analog voltage signal. The output transmission line 2 from the sensor 10 feeds the voltage signal to the analog to digital converter (ADC) 11. The ADC 11 digitizes the analog input voltage on line 2 and outputs the digital representation of the voltage signal, via data bus 5, as input data to the matrix digital signal processor (DSP) 12. A clock 16 outputs a sampling rate signal to the ADC 11 via output 3. The sampling rate provide by clock 16 is at least N times the bandwidth of the designated cell when quadrature sampling is employed. Quadrature sampling takes a first set of samples at the sampling rate and a second set of samples at the sampling rate but with the clock signal shifted 90 degrees. The two sets of samples are often called "I" and "Q" component samples or called "real" and "imaginary" component samples. Quadrature signal processing is signal processing using these two component vectors rather than scalars. Generally, the sampling hardware outputs to the DSP the two I and Q component values. As is customary in digital signal processing architectures, the DSPs in system, in this example DSP 12, are operated in synchronization with ADC 11, so the same clock 16 also supplies all of the DSPs with a clock signal from output 4, which clock signal may be a sub-multiple of the ADC 11 sampling rate provided at output 3.

Figure 1C:
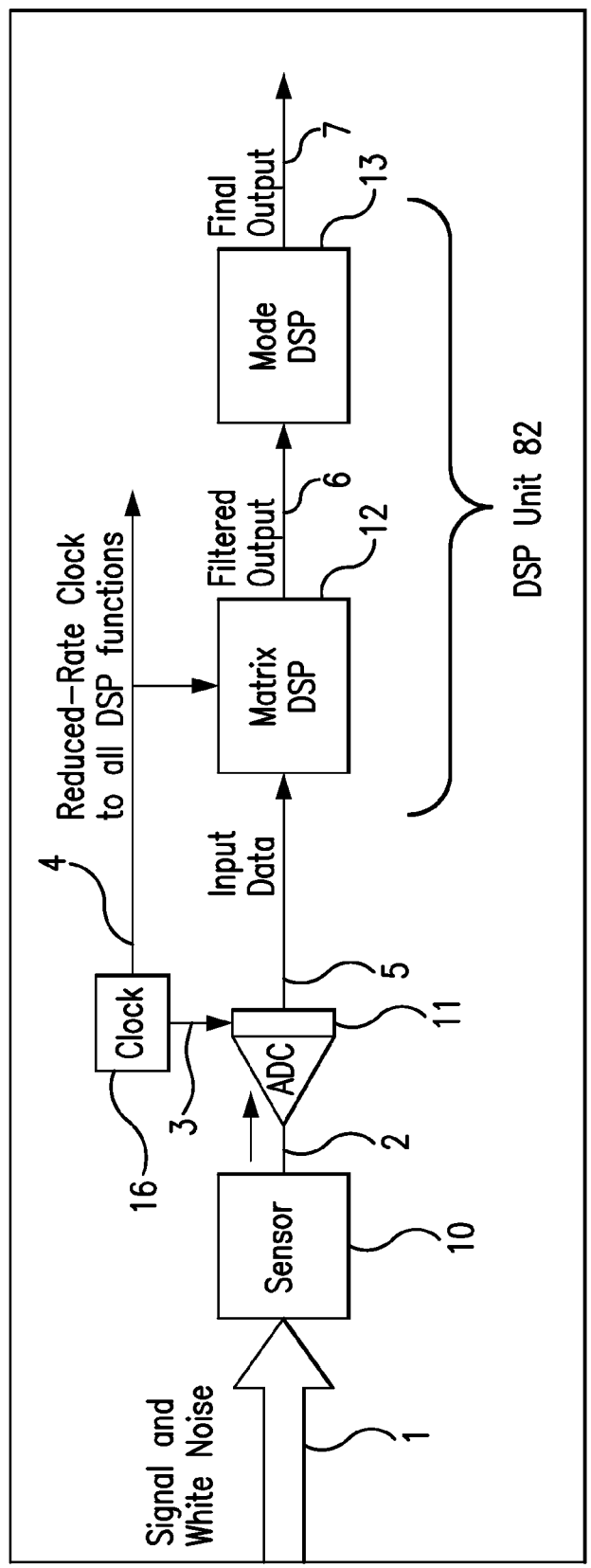
FIG. 1C is a block diagram illustrating an implementation of the present invention for processing multiple events.

The matrix DSP 12 operates on a single event input to create a scalar on bus 6 that is a filtered signal energy estimate for that single event, which is the designated cell signal energy estimate. The details of the processing of DSP 12 will be described in following paragraphs. Where multiple events are to be processed, an even greater sensitivity can be realized. Turning now to FIG. 1C, an example of the DSP unit 82 implementation for processing multiple events is shown. As in the single event example, the digitized N quadrature sample data is input to the matrix DSP 12 via bus 5. The output data of DSP 12 on bus 6 is input to a Mode DSP 13. Mode DSP 13 combines multiple event energy estimates from DSP 12 into a single energy estimate. Specifically, Mode DSP 13 operates on multiple event inputs to create scalars on bus 7 that are the final filtered energy estimates for the combined multiple events, which are the designated cell signal energy estimates. Mode DSP 13 performs Mode 1 and/or Mode 2 processing. Mode 1 processing is a simple energy average, whereas, Mode 2 processing is an "area under the curve" processing. Mode 2 processing adds to the enhanced sensitivity achieved by the signal processing of the sensor system.

Figure 1D:
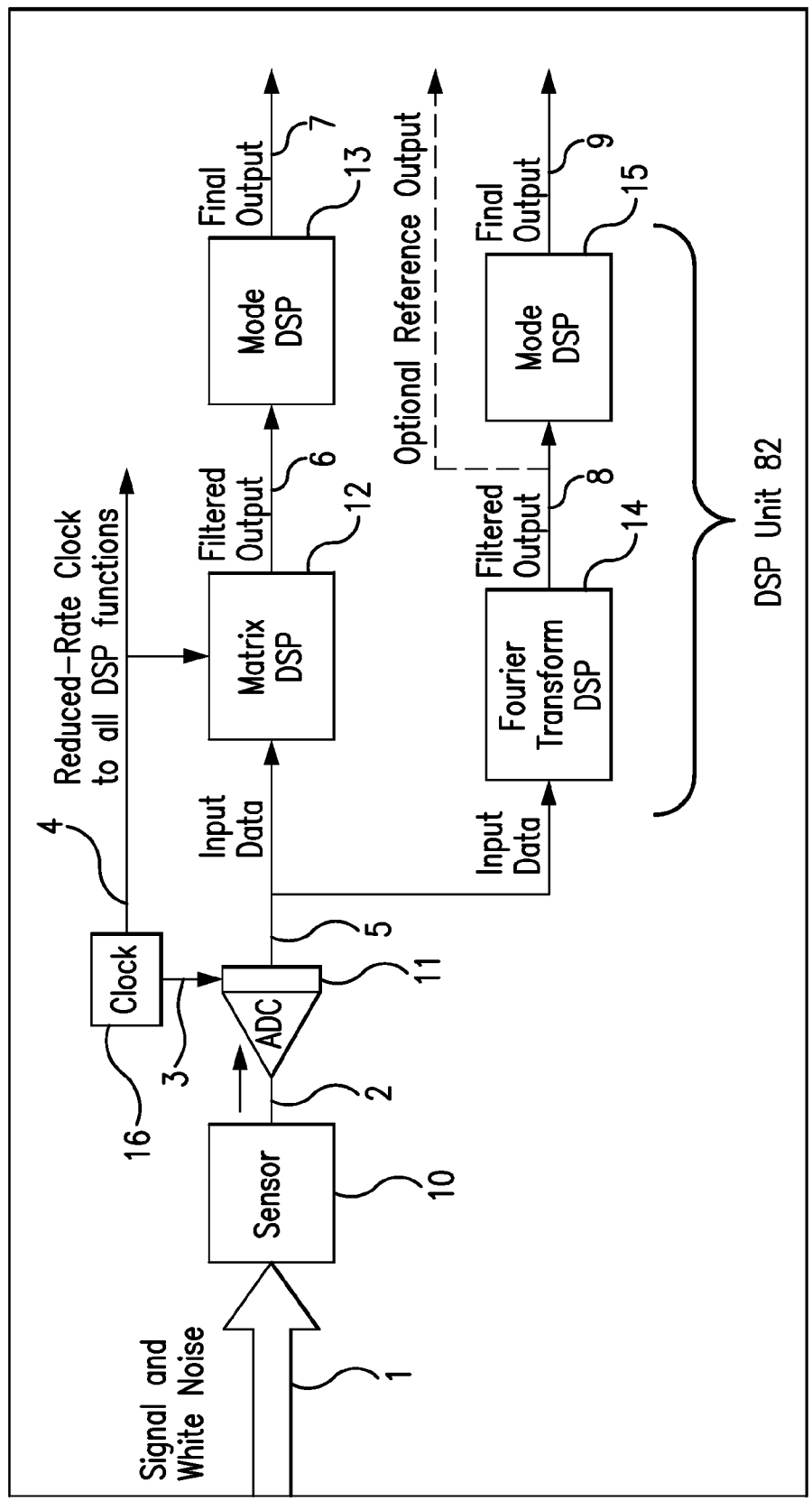
FIG. 1D is a block diagram illustrating an implementation of the present invention for processing multiple events with an option of further enhanced sensitivity for processing multiple event signals.

For single event signals and coherent multiple event signals, the implementations shown in FIGS. 1B and 1C function with superior performance over conventional systems. But for multiple event signals in certain circumstances, a greater sensitivity enhancement may be achieved by combining a conventional Fourier transform digital signal processor with a Mode 2 digital signal processor. As used herein, coherent signals are those in which the phase changes over time can be predicted, such as a signal having a constant phase. FIG. 1D provides an example of the sensor system that includes a further modification to provide an option of yet further enhanced sensitivity when presented with multiple event coherent signals. Adding to the multiple event configuration of DSP unit 82 described with respect to FIG. 1C, DSP unit 82 further includes a conventional Fourier transform digital signal processor (FDSP) 14 that receives the digitized N quadrature sample data via bus 5 and outputs the filtered scalar data on bus 8. The transforms associated with DSP 12 and FDSP 14 will be described in following paragraphs. FDSP 14 may be implemented using a Discrete Fourier Transform (DFT) or a Fast Fourier Transform (FFT), either of which are well known in the art. The output on bus 7 is input to a Mode DSP 15 and may also optionally be used as reference data for comparison with the output on bus 7 during testing and calibration of the system. In a multiple event scenario, the matrix DSP 12 will output energy estimates and FDSP 14 will output both multiple energy estimates and multiple vector estimates, one energy estimate/vector for each event's frequency domain cell. Mode DSP 15 may be used to perform Mode 1, Mode 2 and/or Mode 5 processing, where Mode 5 processing computes the energy of the coherent vector average. As illustrated by the graph in FIG. 11, combining the Mode 5 processing to that of the FDSP 14 (graph line 320) can provide a greater increase in sensitivity of the sensor system when the number of multiple events is large. However, for fewer multiple events, the advantage of that combination is eliminated and the combination of Matrix DSP 12 and Mode DSP 13 provide superior performance (graph lines 322 and 324).

Figure 2A:
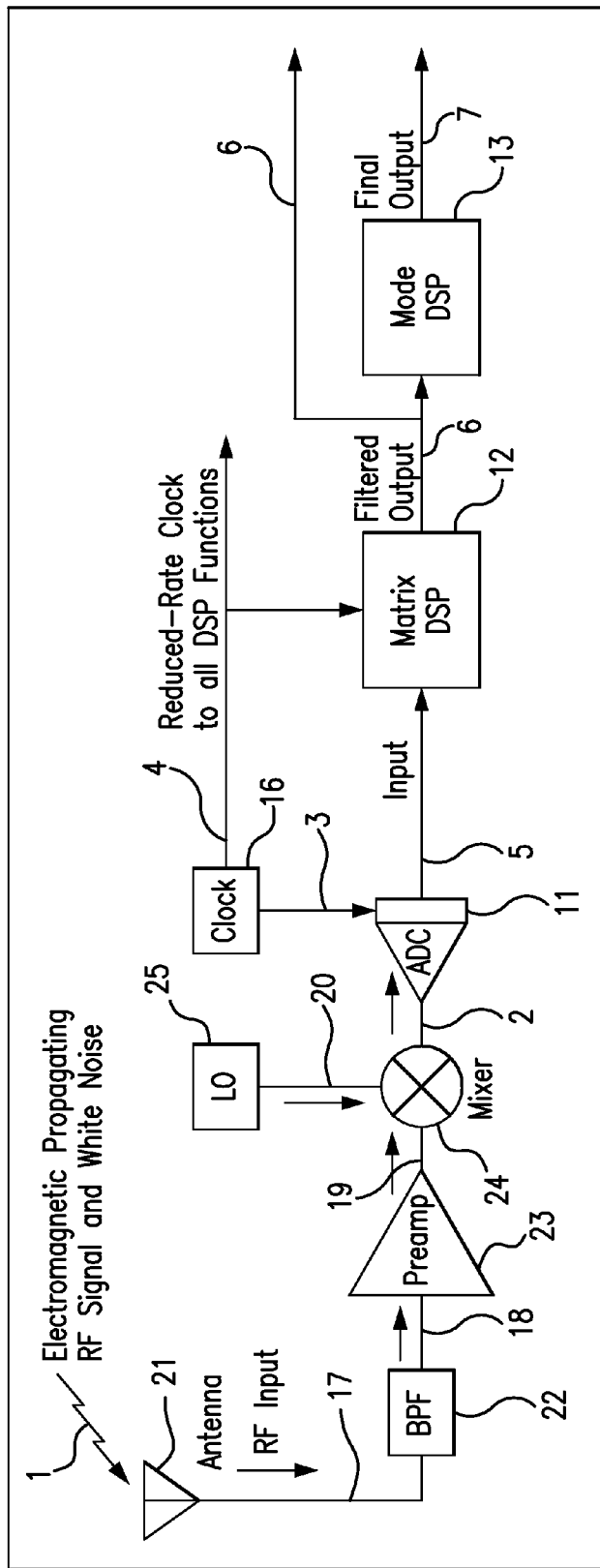
FIG. 2A is a block diagram of the sensitivity enhancement system for processing single and multiple events applied to an electromagnetic signal receiver system.
Figure 2B:
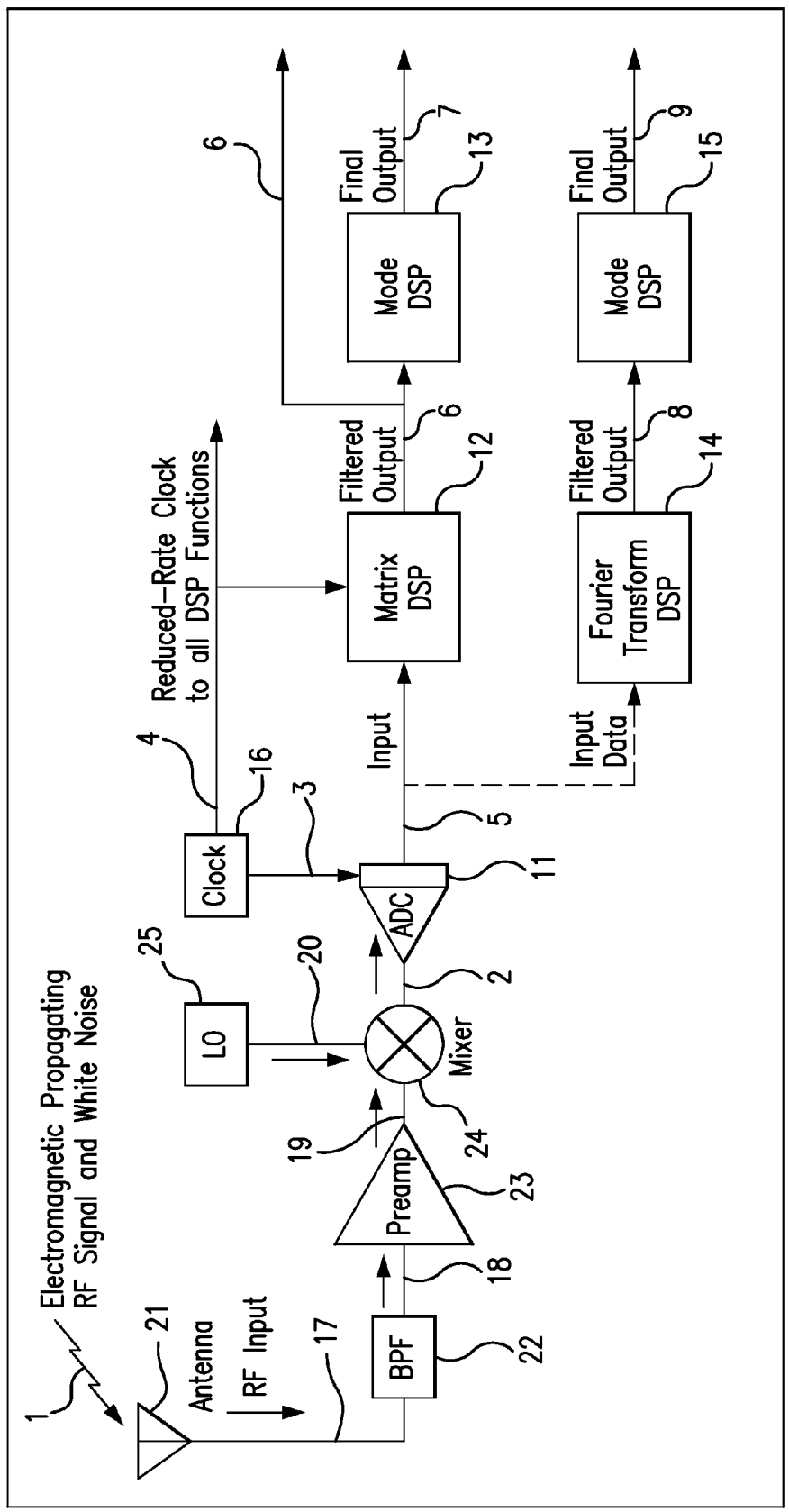
FIG. 2B is a block diagram of the sensitivity enhancement system or processing single and multiple events applied to a receiver system with the option of further enhanced sensitivity for processing multiple event signals.

Turning now to FIGS. 2A and 2B, there are shown examples of the sensitivity enhancement system applied to the reception of radio frequency signals. The "front end" is common to both examples and includes a sensor defined by antenna 21, a band-pass filter (BPF) 22, a preamplifier 23, a mixer or down converter 24, a local oscillator (LO) 25, an ADC 11 and a clock 16. As previously discussed, the bandwidth of the front end is much greater than that typically found in a conventional receiver system (N times greater), so that a measure of the white noise energy outside the bandwidth of the signal of interest (outside the "matched filter bandwidth") can be used to increase the signal sensitivity within the bandwidth of the signal of interest. Although not important to the concepts disclosed herein, such receiver systems may have other features not shown in FIGS. 2A and 2B, the most common of which are (1) means to adjust the reception center frequency by tuning the LO 25 and (2) means for automatic gain control (AGC). Further, the receiver system may also be altered by placing a BPF or a low-pass filter (LPF) between the mixer 24 and the ADC 11 instead of, or in addition to, the BPF 22, especially when the LO 25 is tunable.

The input 1 comprising an electromagnetic propagating RF signal and white noise is detected by the antenna 21 and transferred as a voltage waveform (time varying signal) through the transmission line 17 to the BPF 22. The use of the BPF 22 is to prevent any strong out of band signals from being coupled to the preamplifier 23 or mixer 24 and causing saturation thereof (destroying their linear properties for in-band signals). However, the inclusion of BPF 22 is at a cost of increasing the front end noise figure caused by the BPF 22 insertion loss. Since it is prudent to include the BPF 22 as shown, a BPF having a minimum insertion loss is selected. The BPF 22 filtered output is input to preamplifier 23 through transmission line 18. The function of the preamplifier 23 is to apply sufficient gain, with minimum noise figure, to (1) make the noise figure of the subsequent components essentially irrelevant and (2) match the voltage range (also known as the "dynamic range") of the mixer 24 and ADC 11. The amplified output of preamplifier 23 is coupled to the mixer 24 through transmission line 19. The function of the mixer 24 is to "beat" the input signal supplied by transmission line 19 against the waveform (usually a pure tone) supplied from LO 25 to the mixer via transmission line 20. The mixer 24 outputs on transmission line 2 an intermediate frequency signal which has a frequency that is the difference between the frequency of the amplified output of preamplifier 23 and the frequency of the local oscillator signal provided by the transmission line 20. The intermediate frequency signal output from the mixer 24 is coupled to the ADC 11 by transmission line 2. As described with respect to FIGS. 1B, 1C, 1D, 2A and 2B, ADC 11 digitizes the intermediate frequency signal supplied by transmission line 2 based on the sampling rate supplied by output line 3 of clock 16.

Figure 3:
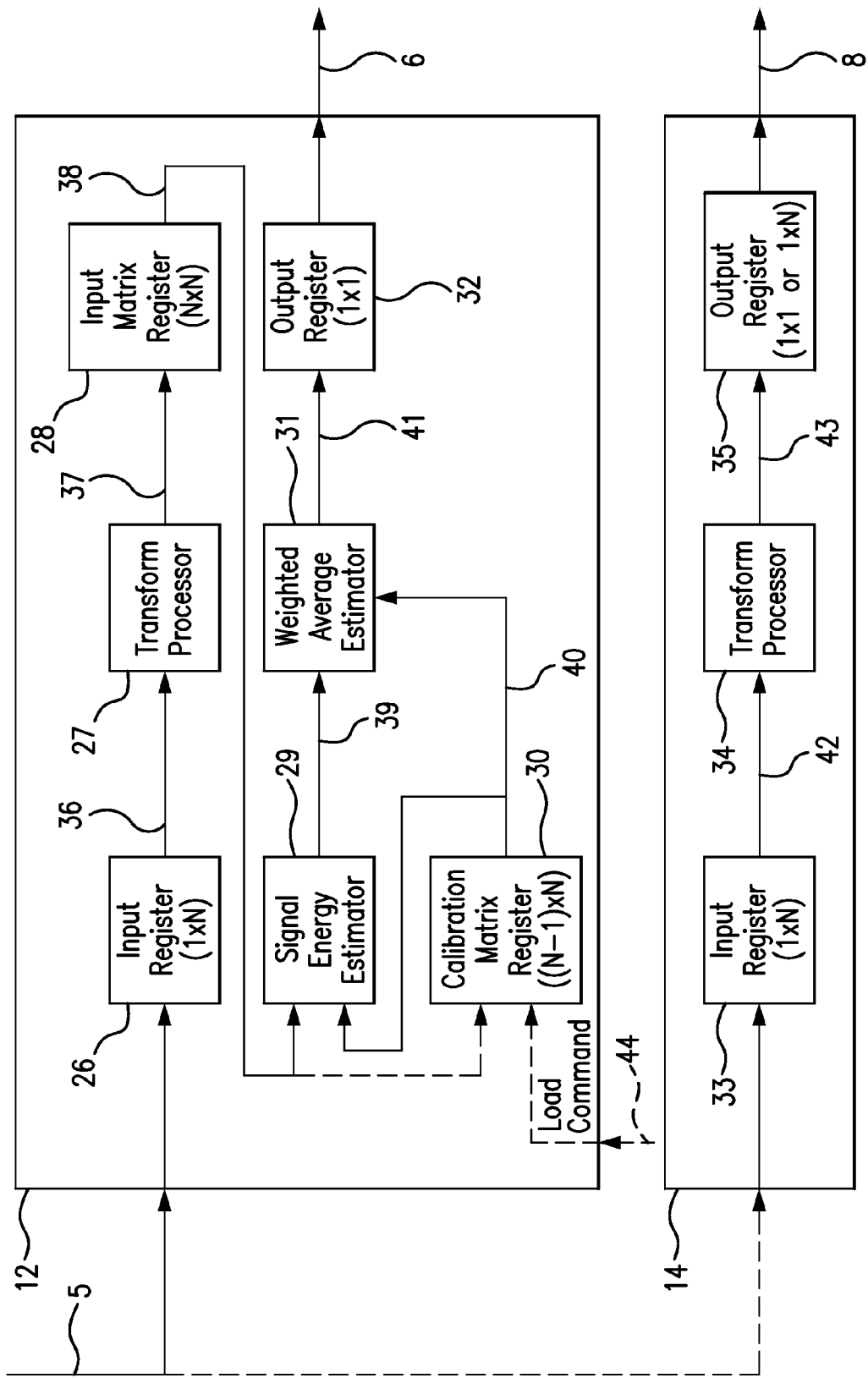
FIG. 3 is a detailed block diagram of the matrix digital signal processor and the Fourier transform digital signal processor.

Referring additionally to FIG. 3, the block diagrams for the internal functioning of the Matrix DSP 12 in FIGS. 1D, 2A and 2B, and the FDSP 14 in FIGS. 1D and 2B, are shown. DSPs 12 and 14 have respective input and output registers 26, 32 and 33, 35. It is understood that in applications where the ADC 11 includes an output register, such could eliminate the need for the input registers 26 and 33. The Matrix DSP 12 achieves its single-event sensitivity enhancement by exploiting a matrix that has been designed to compensate for the white noise in the designated cell by quantifying the white noise outside the designated cell in the input spectrum that is identical to row zero of the matrix. The transforms associated with this matrix will be mathematically described by first mathematically describing the conventional transforms.

The output from the ADC 11 is input to DSP 14 via data the bus 5 in the Example of FIG. 2B. The data is registered in the 1×N register 33, where N is the number of input time domain quadrature samples for each event. FIGS. 4A and 4B show an example of such registered data in rows 157 to 163 inclusive. In this example, N equals eight, the total time interval is one second, and so the quadrature sampling rate is eight Hz. The example's nominal white noise input has zero db of energy (in the total eight-cell bandwidth) and the signal input has three dB of energy (in the single designated cell, cell #1). The noise plus signal nominal net input energy is therefore 4.76 dB, but this example's actual energy for the net input with its specific random noise is 2.22 dB. The input time domain registered samples are shown in Cartesian real and imaginary components in rows 160 and 161, columns C through J inclusive, as they would be in registers 26 and 33 in FIG. 3, while the input time domain samples are also shown in polar magnitude and phase components in rows 162 and 163, columns C through J inclusive. The mathematics for the Cartesian to polar and polar to Cartesian conversions is conventional and therefore not explicitly described herein.

The data register 33 output is coupled to the input of transform processor 34 via data bus 42. Transform processor 34 transforms the time domain data, the N quadrature samples, to frequency domain data in a linear manner. The convention for all transforms is to make the energy in both domains equal. The calculated values from transform processor 34 are output to the output register 35 by data bus 43. An example of the registered data in register 35 is shown in FIG. 4A, rows 165 to 171 inclusive. The Cartesian real and imaginary components are shown in rows 168 and 169, columns C through J inclusive, and also shown in polar magnitude and phase components in rows 170 and 171, columns C through J inclusive. This data of this example is also presented graphically in FIG. 12, in polar components. The N data values from transform processor 34 are transferred to Output Register 35 are output therefrom via bus 8.

The equations for the transform processor 34 time domain polar components transform to the frequency domain Cartesian components are:

$$v_R(m) = \text{SUM}[n](v_A(n) * \text{COS}(v_P(n) * PI - 2 * PI * f_m * t_n) * DT$$

$$v_I(m) = \text{SUM}[n](v_A(n) * \text{SIN}(v_P(n) * PI - 2 * PI * f_m * t_n) * DT$$

where $$t_n = n * DT$$

$$f_m = m * DF$$

Where capital letters are used for functions and constants unless they are subscripts. The subscript "R" identifies a Cartesian real component, the subscript "I" identifies a Cartesian imaginary component, the subscript "A" identifies the polar amplitude or magnitude component, the subscript "P" identifies the polar phase component, "N" is the number of time-domain samples, "n" is the time domain integer counter where $0 \leq n \leq N-1$, "m" is the frequency domain integer counter where $0 \leq m \leq N-1$, "f" is the frequency in Hz, "t" is the time in seconds, "SUM[n]( ... )" is the summation over "n" of the " ... " expression, "COS( ... )" is the cosine function of the " ... " argument, "SIN( ... )" is the sinusoid function of the " ... " argument, "PI" is the constant pi (approximately 3.14159), "DT" is the time domain sampling period in seconds (the reciprocal of the sampling rate in Hz), "DF" in Hz is the reciprocal of the N time domain samples total interval in seconds and "v(n)" and "v(m)" are vector value components in volts or radians (depending on the subscript) in the time domain at time "t" corresponding to the $n^{th}$ sample and in the frequency domain at frequency "f" corresponding to the $m^{th}$ frequency respectively. In the aforesaid example, with N equal to eight, the values of "n" are the integers 0, 1, 2, 3, 4, 5, 6 and 7; the values of "m" are the integers 0, 1, 2, 3, 4, 5, 6 and 7; the values of "t" are 0.000, 0.125, 0.250, 0.375, 0.500, 0.625, 0.750 and 0.875 in seconds; the values of "f" are 0.0, 1.0, 2.0, 3.0, 4.0, 5.0, 6.0 and 7.0 in Hz, the value of "DT" is 0.125 seconds and the value of "DF" is 1.0 Hz.

Again referring to FIG. 2B, the output from the ADC 11 is input to the matrix DSP block 12 via data bus 5. Referring now to FIG. 3, the data is registered in the 1×N input register 26, where N is the number of input time domain quadrature samples for each event. As described above, rows 160 and 161 in FIG. 4A shows an example of the registered data. The output of input register 26 is coupled to the transform processor 27 by data bus 36. The transform processor 27 transforms the N quadrature samples that are time domain data to an N×N matrix in a linear manner. The rows and columns are herein numbered 0 through N−1. The transform processor 27 calculated values are output to the input matrix register 28 through data bus 37. The transformed values in row 0 of the N×N matrix are the conventional transformed frequency domain samples, also known as the input spectrum. FIGS. 4C and 4D show an example of the input matrix register 28 registered data in rows 173 to 200 inclusive. Specifically, the exemplary matrix samples stored in input matrix register 28 are shown in Cartesian real components in rows 177 through 184 and columns C through J inclusive, in Cartesian imaginary components in rows 177 through 184 in columns O through V inclusive, in polar magnitude components in rows 191 through 198 and columns C through J inclusive, and in polar phase components in rows 187 through 198 in columns O through V inclusive.

The equations for the Transform Processor block 27 time domain polar components transform to the matrix Cartesian components are:

$$v_R(w,m) = \text{SUM}[n](v_A(n) * \text{COS}(v_P(n) * PI - 2 * PI * f_m * t_n$$

$$- PI * \text{MOD}(\text{INT}(c_w / 2^{(n-1)}), 2))) * DT$$

$$v_I(w,m) = \text{SUM}[n](v_A(n) * \text{SIN}(v_P(n) * PI - 2 * PI * f_m * t_n$$

$$- PI * \text{MOD}(\text{INT}(c_w / 2^{(n-1)}), 2))) * DT$$

Where, in addition to those conventions already defined, "w" is the matrix row integer counter as well as the code domain integer counter while "m" is now the matrix column integer counter (as well as the frequency domain integer counter as defined above), "MOD( ... ,2)" is the modulo-2 function of the " ... " value, "INT( ... )" is the integer function of the " ... " value, and "v(w,m)" are the vector value components in volts in matrix row "w" and column "m" where $0 \leq w \leq N-1$ with the row having code "c" corresponding to integer counter "w" and the column having frequency "f" corresponding to integer counter "m." The code values of "c" (with subscript w) are a special set of non-duplicated integers. In the example presented in FIGS. 4C and 4D, the values of "w" are the integers 0, 1, 2, 3, 4, 5, 6 and 7 and the values of "c" are the integers 0, 30, 45, 51, 71, 89, 106 and 116. The particular values of "c" give the eight-by-eight code domain by frequency domain (8×8 CD×FD) matrix its needed characteristics and were arrived at through extensive simulation trials comparing results of the matrix DSP transform results with those of the conventional DSP transform for known input signal and white noise levels. The matrix transform mathematics applies to any allowed value of N, but a precise set of integer code values would be needed for each matrix size greater than eight-by-eight and can be derived similarly using the method of arriving at the set of integer code values disclosed herein.

The above described implementation of sensitivity enhancement signal processing using the above matrix transform has been made with sufficient detail to allow those competent in designing sensor systems, including RF receivers, to implement a like system for their particular application, where N=8 time domain samples and the processing uses an 8×8 CD×FD matrix. But larger matrices should give a greater sensitivity enhancement. The increase in sensitivity enhancement with larger sample sizes N requires a higher front-end sampling rate, a longer sampling time length, or some combination thereof. Larger values of N also require sufficient processing power to implement the correspondingly larger matrices. Larger matrix transforms require a corresponding special set of code integer values.

When the number of time domain samples "N" is restricted to N=8^M, where "M" is a positive integer, then the code constants disclosed above for M=1 can be re-used provided M codes are uniquely assigned to each row. For example, the M=1 matrix has a single code for each row while the M=2 matrix has two codes assigned to each row such that no pair of codes is duplicated. Specifically, given a single-event sampling interval of one second, the M=1 case has N=8, a 64-cell matrix with an abscissa with eight Hz total bandwidth and one Hz bandwidth for each column, as shown in FIGS. 4A-4D, 5A-5D and 12, while the M=2 case has N=64, a 4096-cell matrix with an abscissa with sixty-four Hz total bandwidth and one Hz bandwidth for each column.

The mathematics for the M=2, a 64×64 CD×FD matrix transforms is shown here. The equations for N=64 in transform processor 27 (FIG. 3) time domain polar components transform to the matrix Cartesian components are:

$$v_R(w,m) = \text{SUM}[n](v_A(n) * \cos(v_P(n) * PI - 2 * PI * f_m * t_n$$

$$-PI * \text{MOD}(\text{INT}(c_i/2^{(n-1)}),2)$$

$$-PI * \text{MOD}(\text{INT}(c_j/2^{(n-1)}),2))) * DT$$

$$v_I(w,m) = \text{SUM}[n](v_A(n) * \sin(v_P(n) * PI - 2 * PI * f_m * t_n$$

$$-PI * \text{MOD}(\text{INT}(c_i/2^{(n-1)}),2)$$

$$-PI * \text{MOD}(\text{INT}(c_j/2^{(n-1)}),2))) * DT$$

Where, in addition to those symbol conventions already defined: the values of "c" have the eight integer code values already identified except now each row "w" has a pair of codes using the new subscripts "i" and "j" both limited to the range 0 through 7 inclusive and both specified by the integer values of "w" from 0 to 63 inclusive.

Thus, for the 64×64 CD×FD matrix each row has a pair of code values $c_{i,j}$. For the first eight rows, the left codes of the pair are 0 while the right codes will sequentially be 0, 30, 45, 51, 71, 89, 106 and 116. Thus, $c_{i,j}$ for i=0 and j=0-7 the code values will be 0, 0; 0, 30; 0, 45; 0, 51; 0, 71; 0, 89; 0, 106; 0, 116. For the next eight rows the left codes of the pair will be 30 while the right codes will sequentially be 0, 30, 45, 51, 71, 89, 106 and 116. This pattern continues for each group of eight rows to generate the code values for all sixty-four rows. The processing approach for even larger matrices would similarly reuse the integer code values established for c.

Next, the signal energy estimate is made using linear signal processing or quasi-linear signal processing, based on the designated cell and selected cell vector values in the input matrix register 28 and the calibration matrix register 30. The selected cell is defined as that cell used to make the signal energy estimate. "Linear signal processing" is defined as signal processing limited to the following three quadrature-vector functions: (1) addition, (2) multiplication by a constant and (3) filtering, although, technically, filtering can be thought of as a frequency-domain frequency-dependent multiplier constraint. For these purposes, "multiplication by a constant," includes multiplication by a constant waveform (such as multiplying the input by a local oscillator waveform, as is commonly done in the front end of receivers). Multiplication of the waveform by itself is forbidden. The averaging of multiple scalar energy estimates, although it may seem like a linear process, does not necessarily give the same answer as averaging vectors and computing the energy of the averaged vector; therefore energy averaging is herein defined as "quasi-linear signal processing."

The cells that may be declared the selected cell are any of the cells of input matrix register 28, excluding the cells in row zero. Not all of these (N^2−N) allowed cells provide useful information and the quality of the information of the remainder varies from cell to cell. The selected cell and the designated cell vector values are output from the input matrix register 28 through data bus 38 and input to the signal energy estimator 29 as shown in FIG. 3. The other input to the signal energy estimator 29 is the selected cell vector value from the calibration matrix register 30 through the data bus 40.

The calibration matrix register 30 values are created in the same way that the transform processor 27 computes the transformed values from the input waveform matrix values stored in the input matrix register 28, albeit for a calibration input waveform that is herein described in the frequency domain. The calibration input waveform is defined as having a unity-volts-magnitude zero-degrees-phase vector in the designated cell and zero in all the other spectrum cells. FIGS. 5A-5D show an example of the calibration matrix register 30 values for a value of N equal to eight and the designated cell in column 1 of the matrix. FIGS. 4A-4D and FIGS. 5A-5D show unique eight sample input examples, but otherwise show the result of identical processing. As can be seen in FIG. 5C, 38 of the 56 cells not in row zero have a non-zero magnitude. Only those 38 cells provide a useful signal energy estimate. The calibration matrix register 30 can acquire the calibration data several ways. One way is to pre-load the data when the DSP is first programmed, which, depending on the DSP technology (ASIC, FPGA, etc), may be at the time of manufacture. Another option is to input a dummy calibration time domain waveform on bus 5 (the data of which is shown in FIGS. 5A and 5B) that is processed in transform processor 27 normally, except that the load command line 44 (provided when this option is employed) has a calibration trigger that instructs the calibration matrix register 30 to save the calibration data supplied from the input matrix register 28 by a connection with data bus 38.

The Signal Energy Estimator 29 processes the selected cell value according to the following equations:

$$e = |d|^2 * DF$$

when $|V|=0$ then $s=0$, otherwise:

$$u = |v|^2 * DF$$

$$g = |d - \underline{V}^* v|^2 * DF$$

$$E = (|V|^2 - |\underline{V}^* V|^2)/|V|^2$$

$$U = |V|^2 - (|D|^2 - |D - (\underline{V}^* V)|^2)$$

$$s = (e - u - g + E^* u)/(2 * U)$$

Where, in addition to those symbol conventions already defined: "v" is the input matrix register 28 selected cell vector voltage, "d" is the input matrix register 28 designated cell vector voltage, "V" is the calibration matrix register 30 selected cell vector voltage, "D" is the calibration matrix register 30 designated cell vector voltage, having a unity magnitude and zero phase, and "s" is the scalar signal energy estimate in Joules. The interim calculation symbols are: "e" is the designated cell scalar energy in Joules, "u" is the selected cell scalar energy in Joules, "g" is the designated cell scalar energy after the selected cell is blanked and the row or column containing that blanked selected cell is transformed to the designated cell, "E" is the calibration scalar fraction of the selected cell energy of all cells in the row zero spectrum except the designated cell when just the selected cell is transformed to the row zero spectrum and "U" is the calibration scalar fraction of the designated cell energy for the calibration waveform input of all cells in the row zero spectrum except the designated cell when the selected cell is blanked and the row or column containing the selected cell is transformed to the row zero spectrum. When the symbol is underlined that means that the vector's phase angle has been made the negative of what it was, so that it is the complex conjugate vector. The calibration values are shown with capital letters because they are constants. The impedance is assumed to be unity.

The symbol "e" is also defined as the scalar energy estimate output from the output register 35 within the FDSP 14 on bus 8, which data is in addition to the spectrum voltage vector data that may also be on bus 8, as previously described. Of course, the value of "e" has nothing to do with the selected cell or the matrix, except that the row zero of the matrix is identical to the spectrum.

When the bus 5 input waveform matches the calibration input waveform and $|V|>0$ for the selected cell, then the value of "s" computed by these equations will be unity, as it should be. When noise is present and the signal is weak or not present it is not unusual for the value of "s" to be negative, which of course is not physically valid since the true signal energy must be zero or positive.

Next, the individual selected cell estimates of the signal energy are combined to get a single net estimate of the signal energy. The ($N^2-N$) energy estimates made by the signal energy estimator 29 are input to the weighted average estimator 31 by bus 39 and the corresponding ($N^2-N$) calibration values stored in the calibration matrix register 30 are also input to the weighted average estimator 31 by way of bus 40, as shown in FIG. 3. The data transfers on buses 38, 39 and 40 may iteratively pass the data for each selected cell in turn for some applications where the signal is discontinuous, such as where the signal is a radar pulse, but may need to be simultaneous for all allowed selected cells for applications where the signal is continuous in order to maintain the data rate.

The net energy estimate computed by the weighted average estimator 31 is:

$$H_k = |V_k|^2 * DF$$

$$q = \text{SUM}[k](s_k * H_k)/\text{SUM}[k](H_k)$$

Where, in addition to those symbol conventions already defined: "k" is the selected cell address integer counter, "SUM[k]( ... )" is the summation over "k" of the " ... " expression and "q" is the final energy estimate scalar value. The interim calculation scalar value "H" is the energy in the calibration matrix selected cell number k. The integer values of "k" are from unity to ($N^2-N$). For example, when N is eight, then $1<=k<=56$. Negative values of q are normally dealt with in the Mode DSP 13. If Mode DSP 13 is not used, as in FIG. 1B, negative q values are set to zero.

The scalar value of "q" is output from the weighted average estimator 31 and input to the Output Register 32 over bus 41. The output of output register 32 is, in turn, output from the matrix DSP 12 through data bus 6. As previously described, the scalar value "e" is output from the output register 35 within the FDSP 14 on data bus 8.

The signal processing can be extended to combine single-event signal-energy estimates to make a signal energy estimate good for a multiple event extended time period. Referring back to FIGS. 1C, 1D, 2A and 2B, the matrix DSP 12 filtered energy estimate, a scalar, can be output to a Mode DSP 13 via data bus 6 and with respect to FIGS. 1D and 2B, the FDSP 14 filtered energy estimate, a scalar, and/or the full spectrum of the input, a set of N vectors, can also be output to a Mode DSP 15 via data bus 8. Mode 1, Mode 2 and Mode 5 multiple-event processing options potentially operate on this data as individually described in following paragraphs.

Specifically, the Mode DSP 13 may be used to implement any of Mode 1 or Mode 2 and the Mode DSP 15 may be used to implement any of Mode 1, Mode 2 or Mode 5. Mode 1 and Mode 2 are implemented identically whether implemented in the Mode DSP 13 or the Mode DSP 15, although the values input to Mode DSP 13 and Mode DSP 15 are generally different.

Figure 6A:
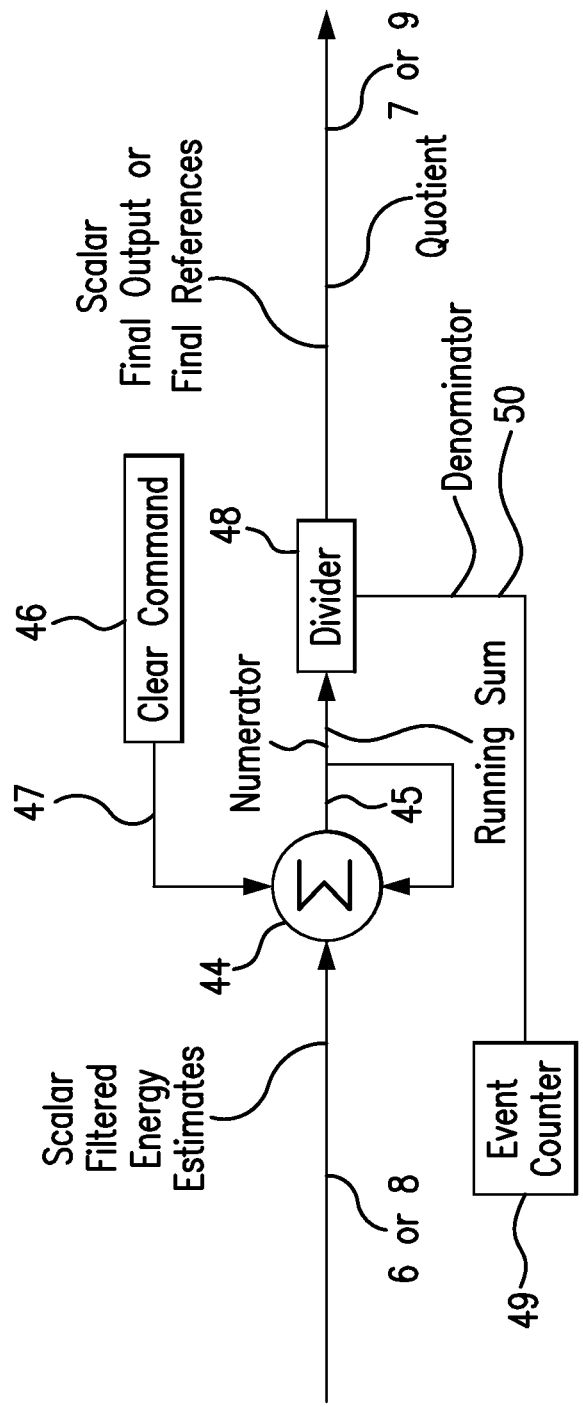
FIG. 6A is a block diagram of an exemplary implementation of a Mode 1 processor.

Mode 1 processing is simply the average of the single-event energy estimates where negative values of q are set to zero. Since the average is of energy scalars, not voltage vectors, this is a quasi-linear function. One of several ways to implement the Mode 1 processor is shown in FIG. 6A. The individual event scalar filtered energy estimates are input to the respective Mode 1 processor from the matrix DSP 12 via data bus 6 when the Mode 1 processor is implemented as the Mode DSP 13 (FIG. 1C) and/or from the FDSP 14 via data bus 8 when the Mode 1 processor is implemented as the Mode DSP 15 (FIG. 1D). The data on bus 6 or bus 8 (FIG. 6A) is fed to the adder 44 that has an output 45 that is fed back to the adder 44 to make a running sum that is calculated for each event. The Clear Command 46 is coupled to the adder 44 via line 47 and clears the adder 44 running sum at the beginning of a multiple event time period. The adder 44 running sum is input to the divider 48 via bus 45, acting as the division numerator, while the count of the event counter 49 is input to the divider 48 via bus 50, acting as the division denominator. The division quotient is output from the divider 48 via bus 7 when the Mode 1 processor is implemented as the Mode DSP 13 or via bus 9 when the Mode 1 processor is implemented as the Mode DSP 15.

If a Mode 2 processor in implemented, the Mode 2 processor has a partitioned array of energy level cells, each cell with a threshold. The processing counts the signal energy estimate above-threshold events in each cell, converts this count into a percentage and then calculates the "area under the curve" for the percentage-versus-energy graph for use as an overall energy estimate. This processing is nonlinear.

Figure 6B:
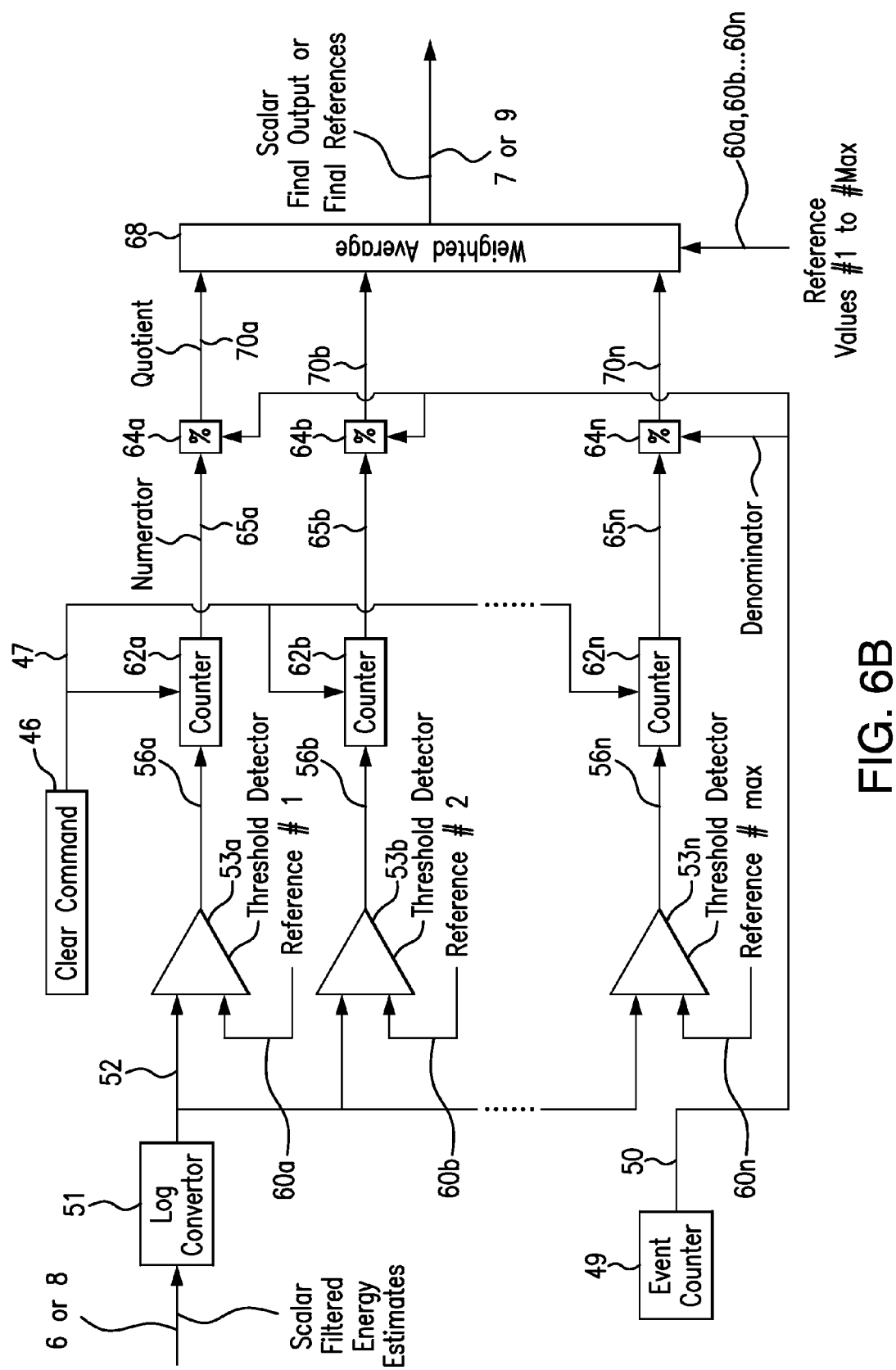
FIG. 6B is a block diagram of an exemplary implementation of a Mode 2 processor.

Referring to FIG. 6B, there is shown one of several ways to implement the Mode 2 processor. The scalar filtered energy estimates are input to the Mode 2 processor from the Matrix DSP 12 via data bus 6 when the Mode 2 processor is implemented as the Mode DSP 13. In this case, negative q values are set to zero. When the Mode 2 processor is implemented as Mode DSP 15, the scalar filtered energy estimates are input from the FDSP 14 via data bus 8. The energy estimates on bus 6 and/or bus 8 are converted to a log value in the log converter 51 that must deal with out of range inputs such as zero, and this log value is fed to a bank of threshold detector difference amplifiers $53_a$-$53_n$ via data bus 52. The number of threshold detectors in the bank is a function of the number of data points on the "curve" for which calculations are being made. For each event, these threshold detectors $53_a$-$53_n$ output a logic 0 or logic 1 via lines $56_a$-$56_n$ depending on whether the value on bus 52 is above the reference threshold #1 on bus $60_a$, reference threshold #2 on bus $60_b$ and reference # "maximum" on bus $60_n$, respectively. Out of range inputs are put in the extreme left or right cells. This bank of threshold detectors is fed to a corresponding bank of counters. The logic state from threshold detector $53_a$ is fed to Counter $62_a$ via line $56_a$, the logic state from threshold detector $53_b$ is fed to Counter $62_b$ via line $56_b$ and the logic state from threshold detector $53_n$ is fed to Counter $62_n$ via line $56_n$. The Clear Command 46 resets to zero these counters $62_a$-$62_n$ via line 47 at the beginning of the multiple event time period. The outputs from the bank of counters are respectively input to a corresponding bank of dividers that calculate the count percentages. The count from Counter $62_a$ is fed to the percentage calculator $64_a$ via data bus 65$_a$, the count from Counter 62$_b$ is fed to the percentage calculator 64$_b$ via data bus 65$_b$, and the count form Counter 62$_n$ is fed to the percentage calculator 64$_n$ via data bus 65$_n$. The Event Counter 49 provides the denominator for the division performed by percentage calculators 64$_a$-64$_n$ via bus 50. The bank of percentage calculators 64$_a$-64$_n$ all output to the weighted average processor 68. Percentage Calculator 64$_a$ provides an output to the weighted average processor 68 via bus 70$_a$, the percentage calculator 64$_b$ outputs to the weighted average processor 68 through the bus 70$_b$, and the percentage calculator 64$_n$ provides an output to the weighted average processor 68 via bus 70$_n$. The bank of reference values are also supplied to the weighted average processor 68 respectively through buses 60$_a$-60$_n$. The weighted average processor 68 data output is placed on bus 7 when the Mode 2 processor is implemented as the Mode DSP 13, and/or placed on bus 9 when the Mode 2 processor is implemented as the Mode DSP 15.

The data input to the weighted average processor 68 on busses 70$_a$-70$_n$ can be thought of as the ordinate values of a graph and the data input to the weighted average processor 68 on busses 60$_a$-60$_n$ can be thought of as the abscissa values of a graph. Here, the abscissa values are equally spaced on a log scale. The weighted average calculation result is the area under the curve of this graph. Computer model tests have confirmed that the properly scaled area under the curve is a good estimate for the signal strength, giving better sensitivity than even coherent processing for some conditions. As is known, for computing a weighted average each abscissa value is multiplied by the curve's ordinate value, all of the multiplication values are summed and that sum is divided by the sum of the curve's ordinate values.

Figure 7B:
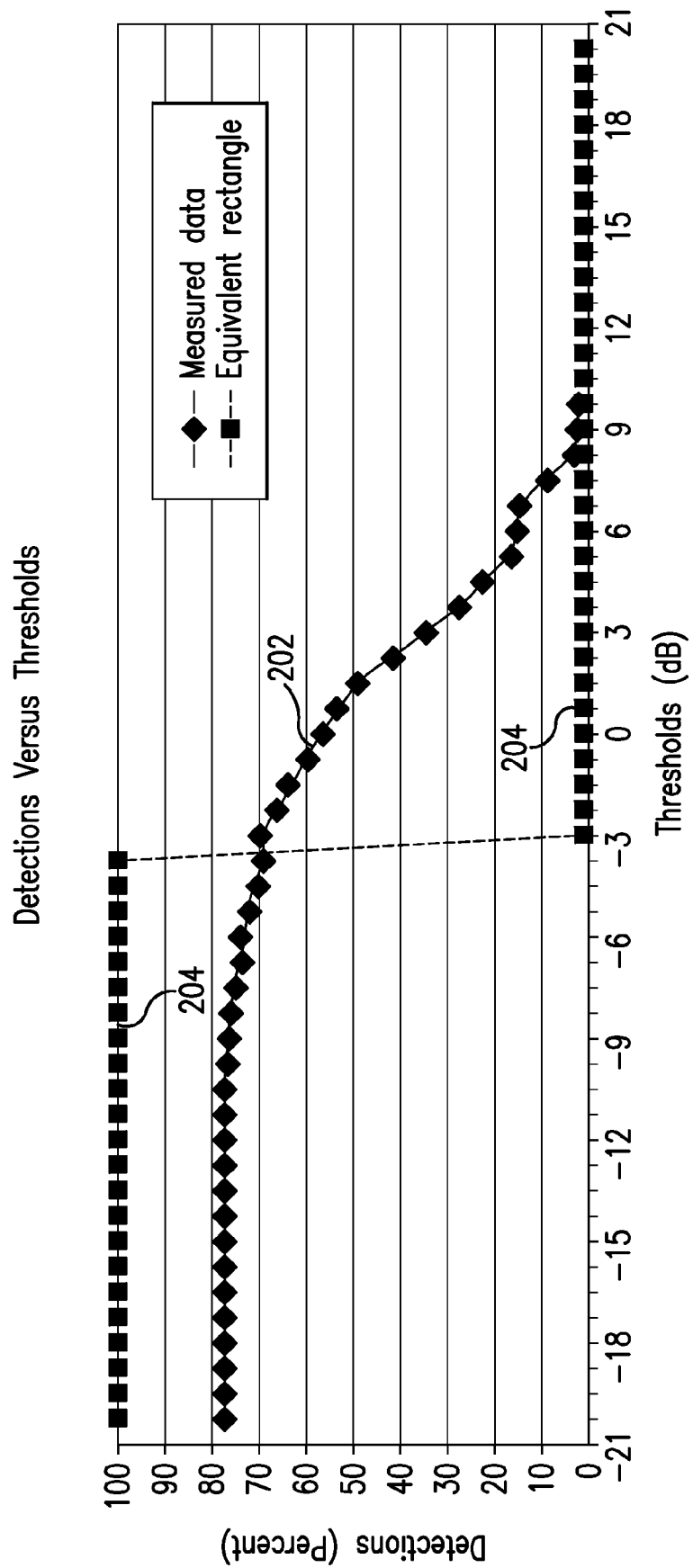
FIG. 7B is a graphical presentation of exemplary results for mode 2 processing.

An example of the Mode 2 processing is shown in FIGS. 7A and 7B. In this example, N is equal to 8 and the designated cell has a zero dB nominal noise level. In FIG. 7A, the threshold values are shown from spreadsheet cell D441 to AT441: from −21 dB to +21 dB in one dB steps. Initially, all the cells shown from spreadsheet cell D443 to AT443 are set to zero. For each event, for each cell shown from spreadsheet cell D442 to AT442, when the signal energy estimate, expressed in dB, is greater than the corresponding threshold cell value in row 441, less 0.50 dB, a "1" is placed in the cell. For each event, for each cell shown from spreadsheet cell D443 to AT443, the cell value is increased by one when the corresponding cell in row 442 is a one and the percentage count is calculated for the corresponding cell in row 444. In the example there have been 64 events. The lowest threshold, shown in spreadsheet column D, has made a detection in 50 of these 64 events for a 78.13 percent detection rate; most of the higher thresholds have detected fewer. The "area under the curve" is calculated from these percentages and is shown in cell D445 as −3.33 dB as a running value and in cell H445 as a registered value. Since 64 events were expected, the D445 value is the final value and cells D445 and H445 are identical. The graph in FIG. 7B shows both the measured-data curve 202 and a curve 204 based on data representing a rectangle having the same area under its "curve" as the measured-data curve. The edge of this rectangle identifies the Mode 2 net energy result.

Mode 5 processing is simply the energy of the average of the single-event vectors. Since the average is of voltage vectors, not energy scalars, the averaging is a linear function and the averaging processing is considered coherent. The Mode 5 processing may be included in the system as a useful reference or when (for particular applications) the signal multiple-event phase modulation happens to be known.

Figure 6C:
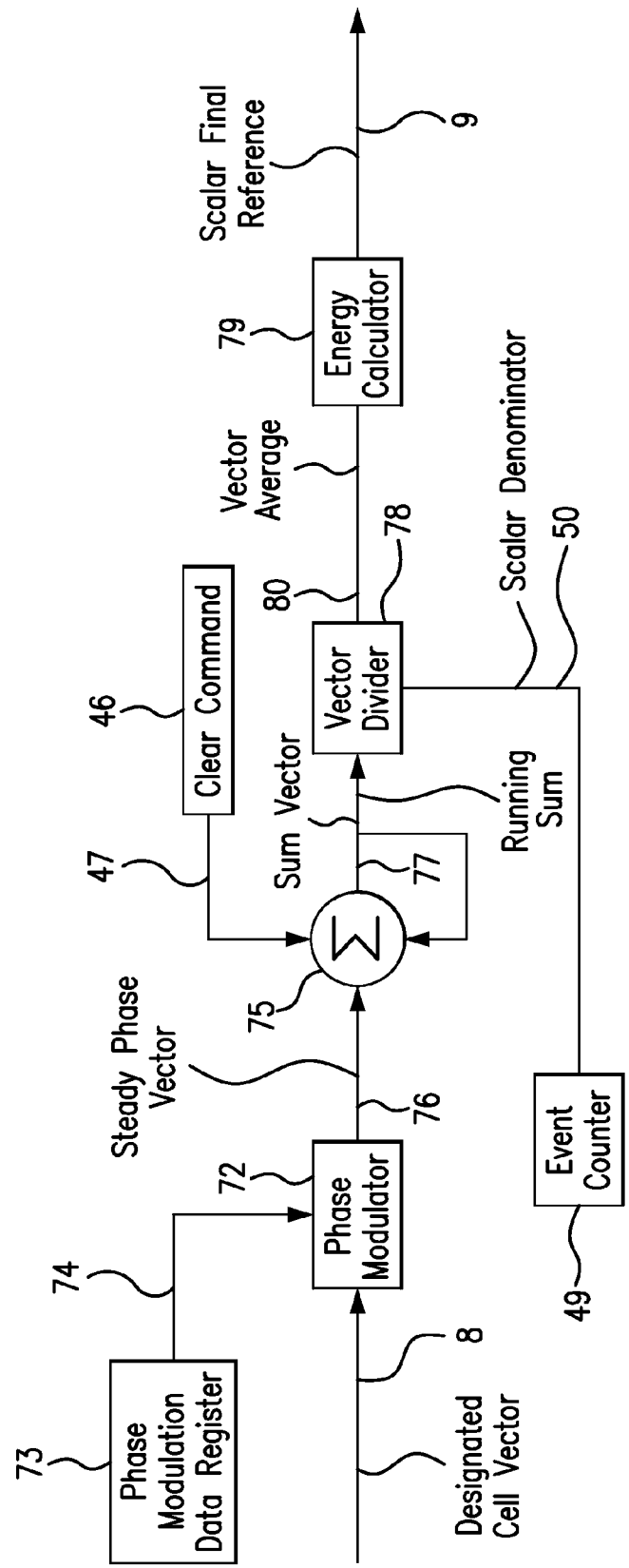
FIG. 6C is a block diagram of an exemplary implementation of a Mode 5 processor.

One of several ways to implement the Mode 5 processor is shown in FIG. 6C. The Mode 5 processor, when used, is implemented as the Mode DSP 15. The designated cell vector is input to the phase modulator 72 from the FDSP 14 through data bus 8. The data needed to demodulate the phase changes, stored in the phase modulation data register 73, based on a priori known information about the signal waveform, is also fed to the phase modulator 72 by the data bus 74. The data from phase modulation data register 73 is always equal to zero if the signal's phase is known to be constant over the multiple events extended time period. Phase modulator 72 effectively subtracts the phase value on bus 74 from the vector phase value on bus 8. The phase modulator 72 output vector, with its adjusted phase, is input through data bus 76 to the vector adder 75. The adder 75 has its output fed back on bus 77 to the summation to make a running vector sum that is calculated for each event. The Clear Command 46 clears the adder 75 running sum via line 47 at the beginning of the multiple event time period. The adder 75 running sum is input through bus 77 to the vector divider 78, acting as the division vector numerator, while the count of event counter 49 is input to the vector divider 78 through bus 50, acting as the division scalar denominator. The division quotient vector calculated by the vector divider 78, that is the average of the vectors that have been received thus far, is input through data bus 80 to the energy calculator 79. The energy calculator 79 calculates the signal energy, which is the square of the vector magnitude multiplied by the designated cell bandwidth divided by the impedance, and outputs the calculated signal energy on bus 9.

Figure 8A:
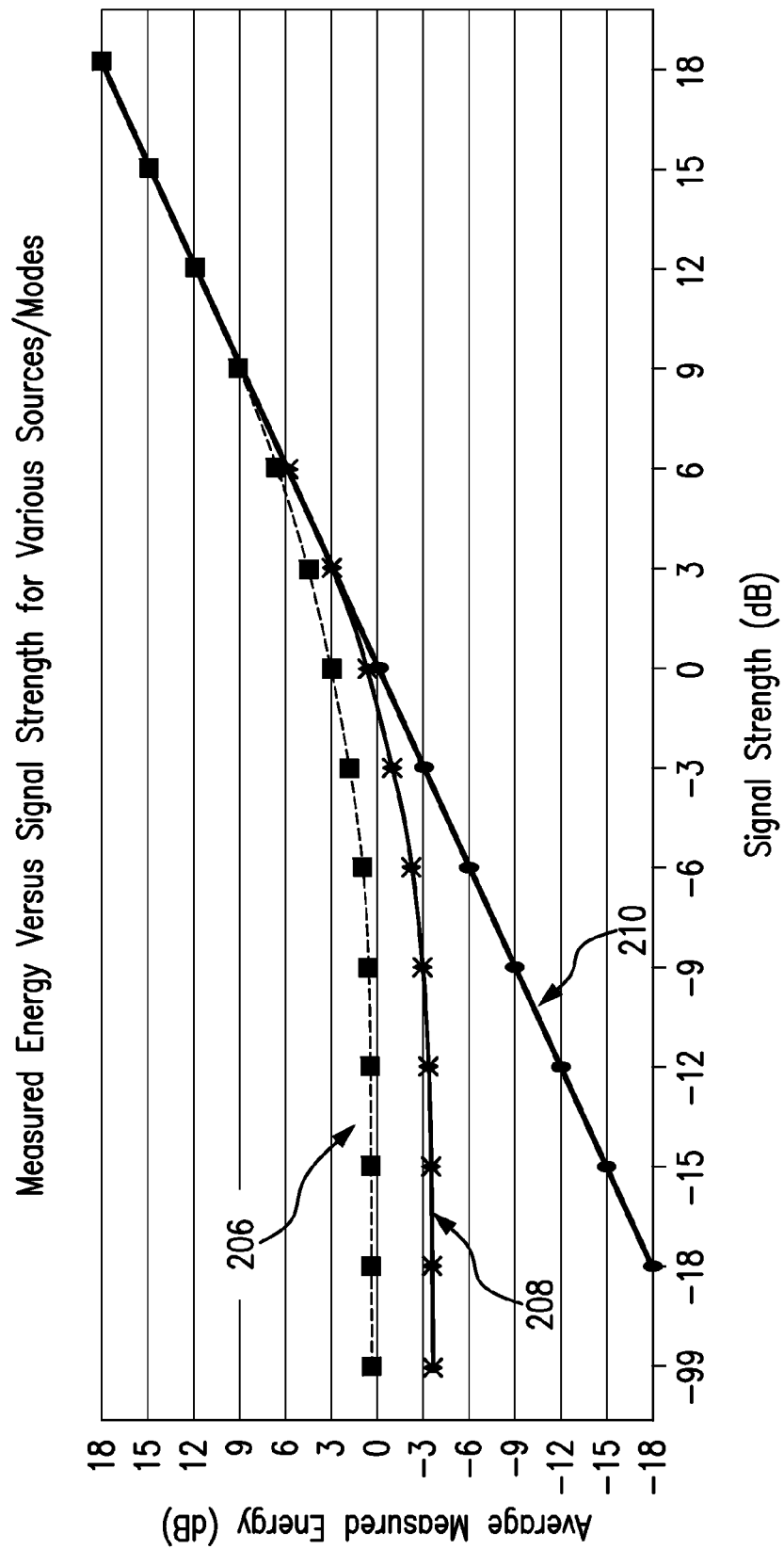
FIGS. 8A and 8B are graphical presentations of exemplary results for single event processing of the matrix digital signal processor.
Figure 8B:
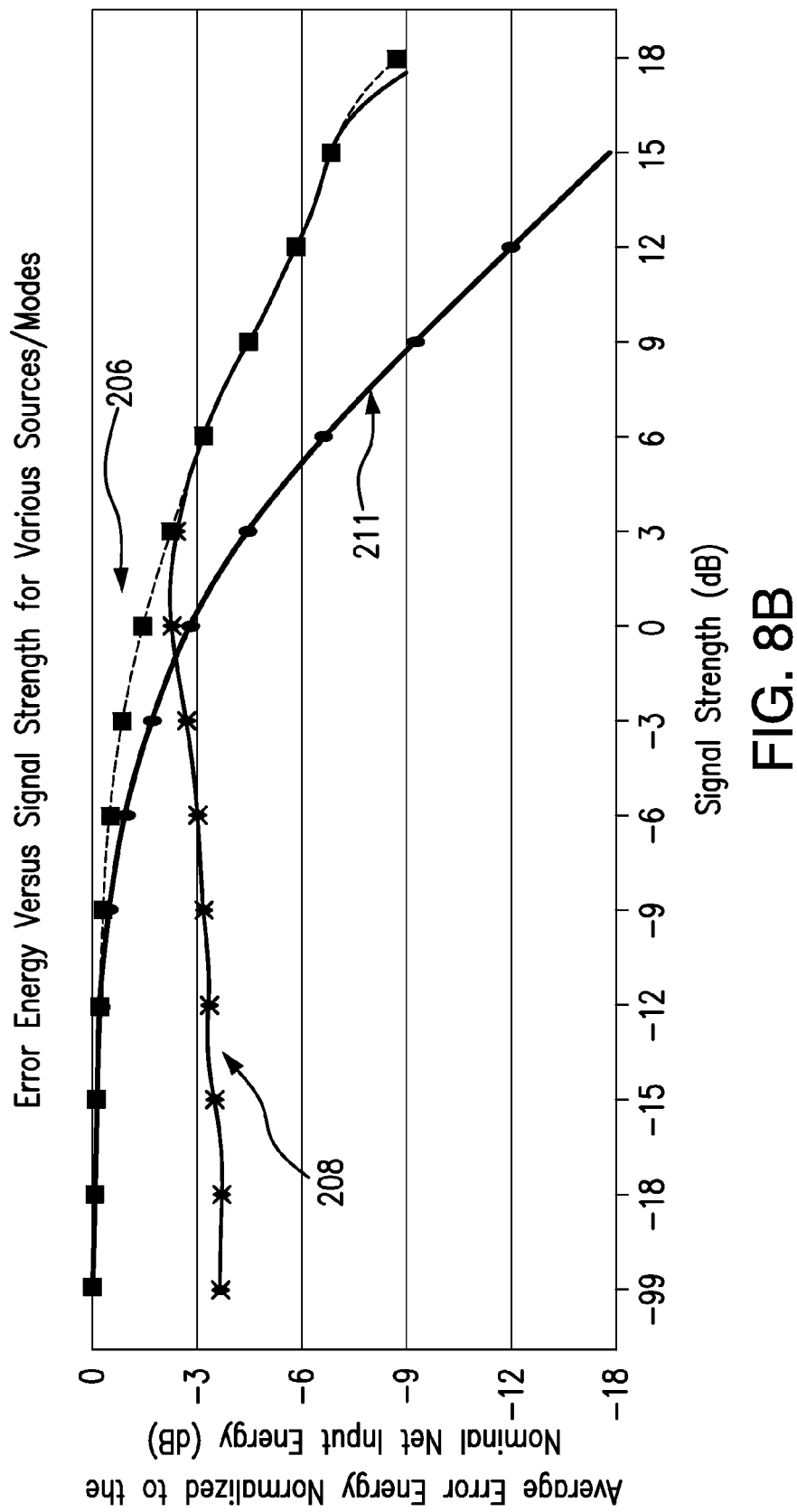
Figure 9A:
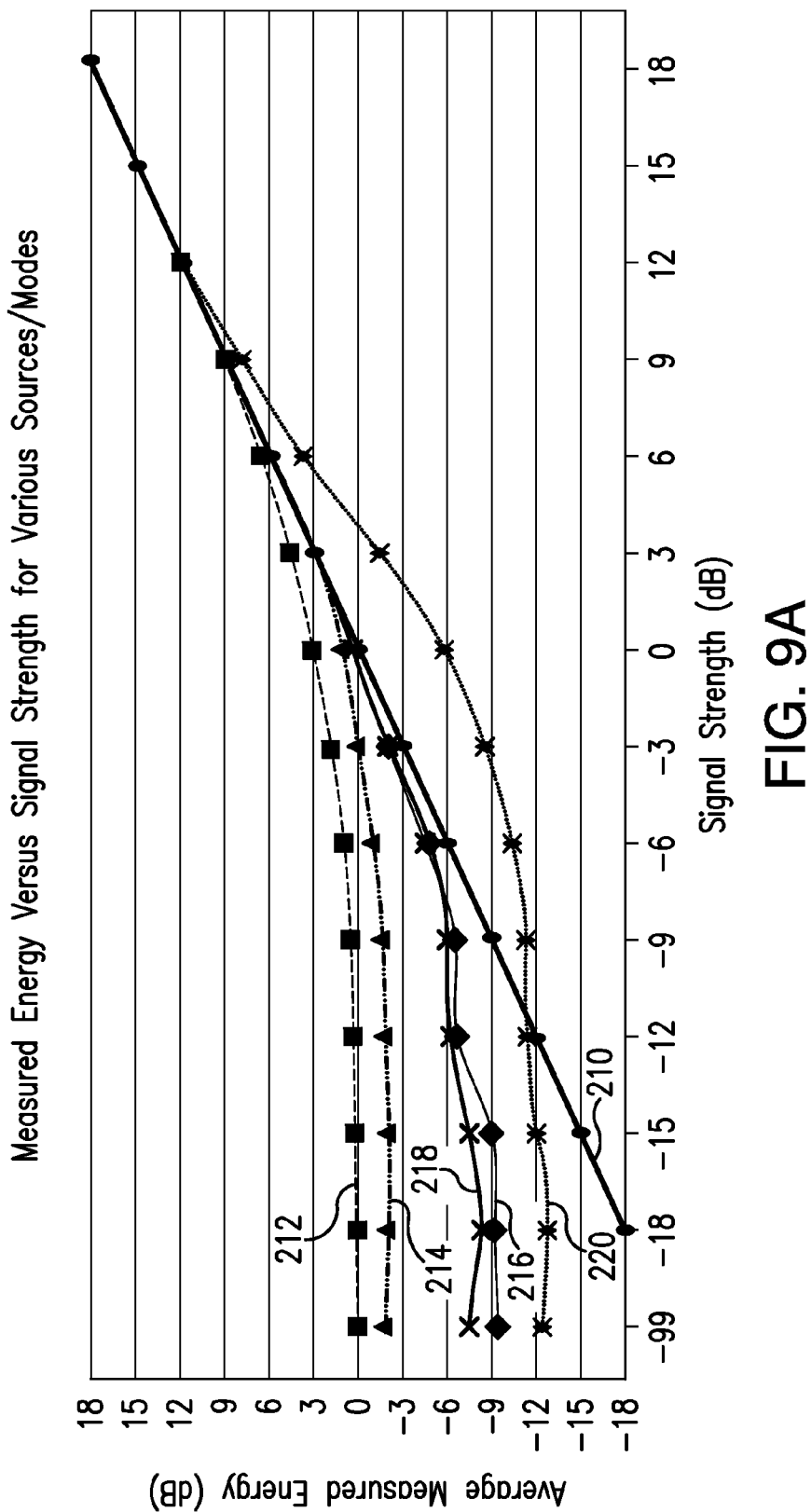
FIGS. 9A and 9B are graphical presentations of exemplary results for multiple event processing of eight events.
Figure 9B:
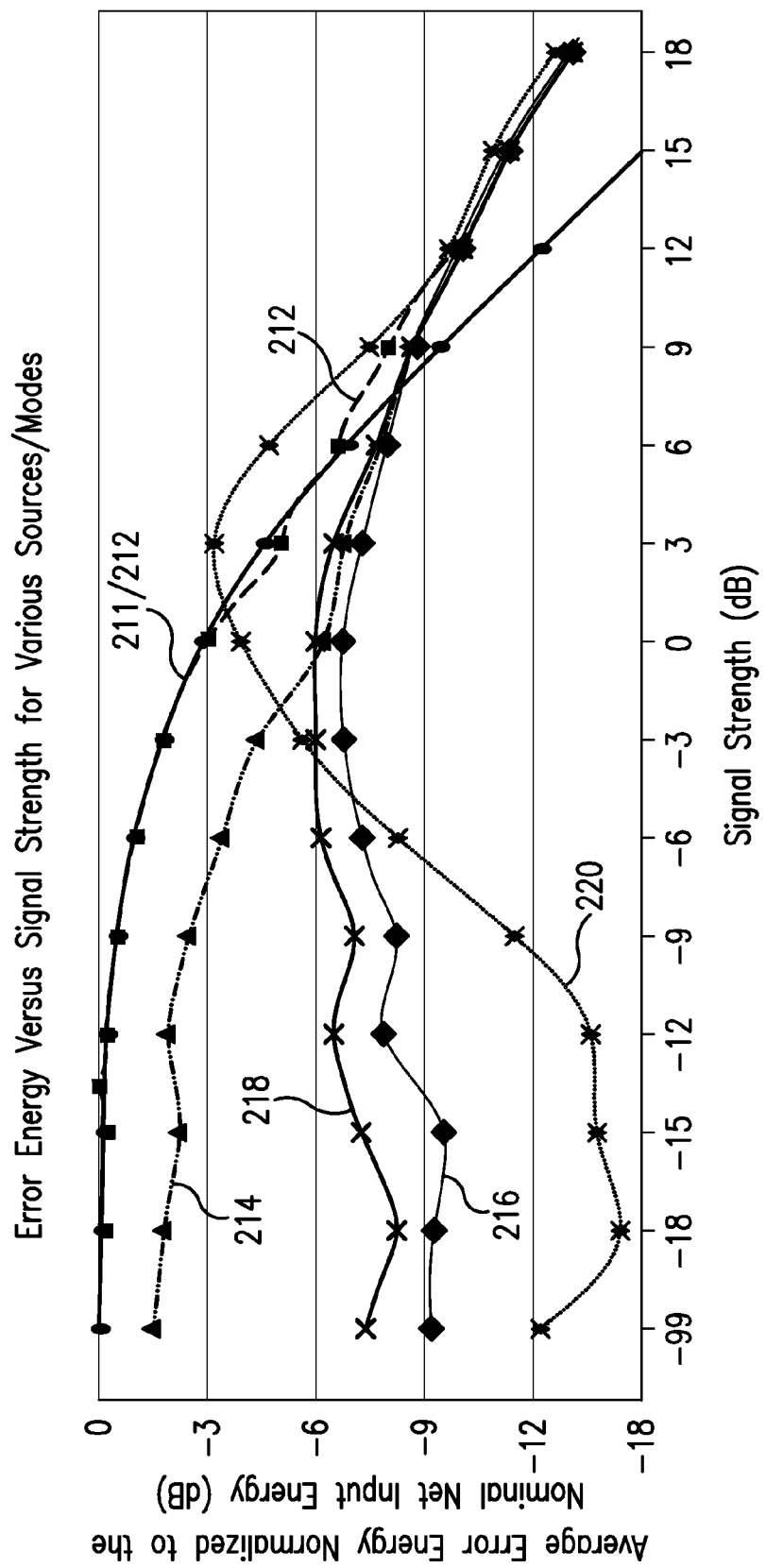
Figure 10A:
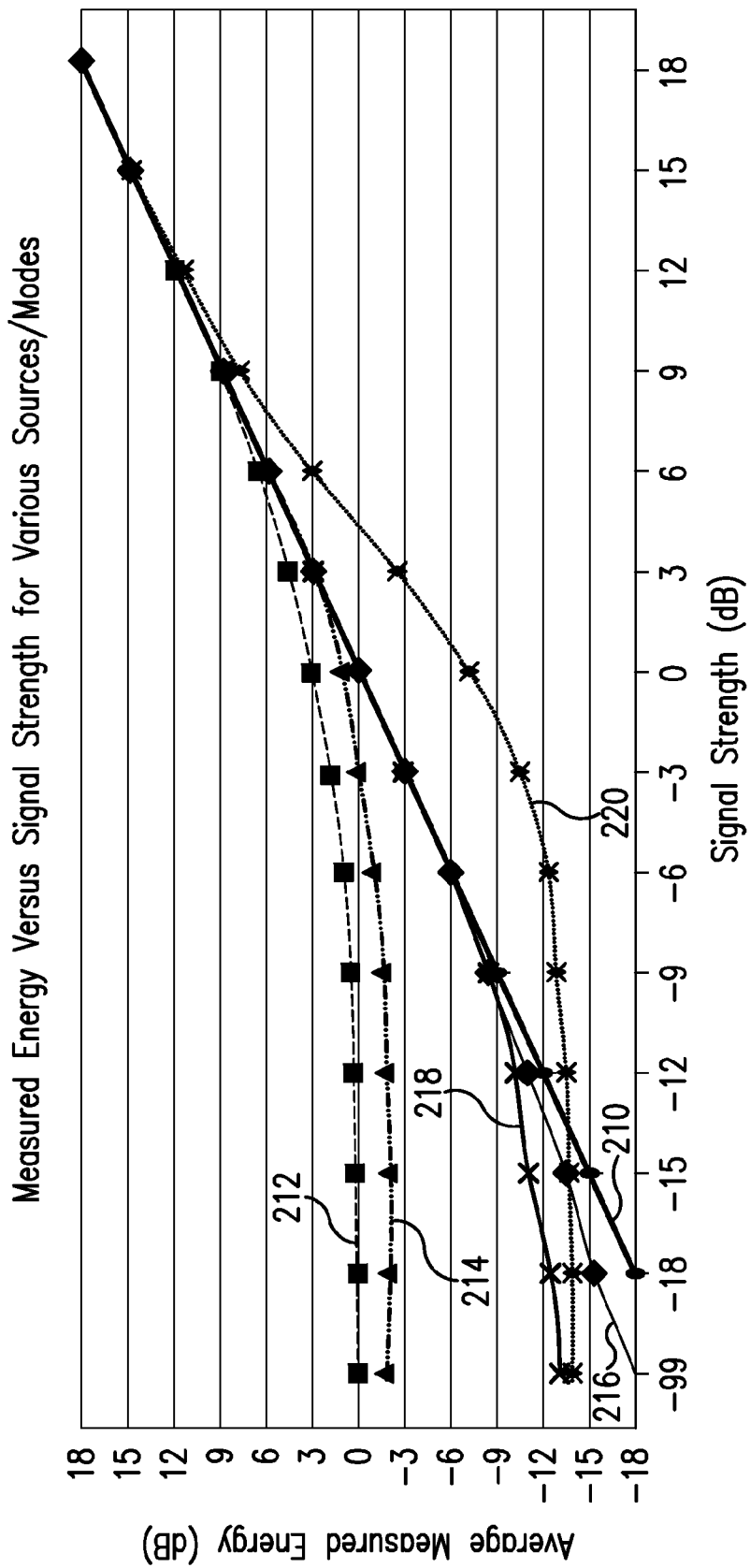
FIGS. 10A and 10B are graphical presentations of exemplary results for multiple event processing of sixty-four events.
Figure 10B:
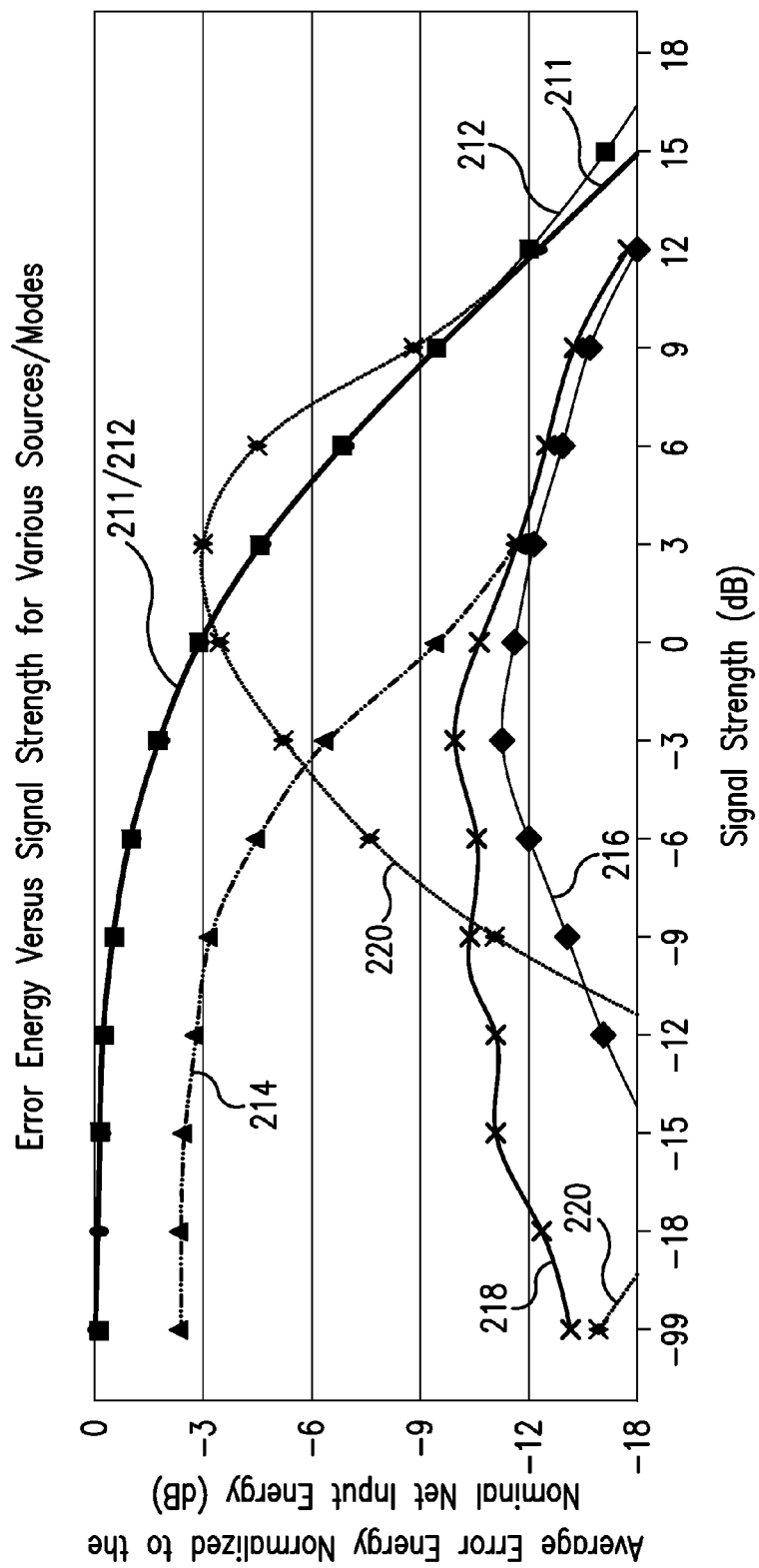

The results for an 8×8 CD×FD matrix is shown graphically in FIGS. 8A and 8B for a single event assessed statistically for 1024 repetitions, using a computer model of the system where the nominal noise energy in each spectral cell is zero dB. The graph line 206 represents the data provided from the combined FDSP 14 and mode DSP 15. The output data for each of Mode 1, Mode 2 and Mode 5 processing overlaps and defines the single graph line 206. The graph line 208 represents the data provided from the combined matrix and mode DSPs 12 and 13. The output data for each of Mode 1 and Mode 2 processing overlaps and defines the single graph line 208. The input signal data used in the computer Model is represented by graph line 210. The curves for the combined FDSP 14 and mode DSP 15 for Modes 1, 2 and 5 lie on top of one another and those of the combined matrix and mode DSPs 12 and 13 for Modes 1 and 2 lie on top of one another because there is only a single event. Results for eight events assessed statistically for 128 repetitions are shown in FIGS. 9A and 9B and results for sixty-four events assessed statistically for 128 repetitions are shown in FIGS. 10A and 10B. The graph line 210 represents input signal data in each of those FIGS. 9A and 10A graphs. In FIGS. 9A and 9B, the graph line 212 represents the data provided from the combined FDSP 14 and mode DSP 15 for Mode 1 processing and overlaps the graph line 210 in FIG. 9B; the graph line 214 represents the data provided from the combined FDSP 14 and mode DSP 15 for Mode 2 processing and the graph line 216 represents the data provided from the combined FDSP 14 and mode DSP 15 for Mode 5 processing. Further, in FIGS. 9A and 9B, the graph line 218 represents the data provided from the combined matrix and mode DSPs 12 and 13 for Mode 1 processing and the graph line 220 represents the data provided from the combined matrix and mode DSPs 12 and 13 for Mode 2 processing. In FIGS. 10A and 10B, the graph line 212 represents the data provided from the combined FDSP 14 and mode DSP 15 for Mode 1 processing, the graph line 214 represents the data provided from the combined FDSP 14 and mode DSP 15 for Mode 2 processing and the graph line 216 represents the data provided from the combined FDSP 14 and mode DSP 15 for Mode 5 processing; the graph line 218 represents the data provided from the combined matrix and mode DSPs 12 and 13 for Mode 1 processing and the graph line 220 represents the data provided from the combined matrix and mode DSPs 12 and 13 for Mode 2 processing. The nominal noise is identical for all the events and all the figures.

In each of FIGS. 8A, 9A and 10A, the graph shows the average measured energy in dB on the ordinate scale (except of graph line 210 which represents the input signal data) versus the signal strength in dB on the abscissa scale and in each of FIGS. 8B, 9B and 10B, the graph shows the average error energy normalized to the nominal net input energy in dB on the ordinate scale (except of graph line 211 which represents the noise energy to input energy ratio data) versus the signal strength in dB on the abscissa scale; both sets of abscissa scales are identical. The simulation was run for fourteen signal magnitude values separated by three dB except for the lowest signal magnitude (at −99 dB signal magnitude, essentially no signal present). The signal phase was randomized for each input event and the signal frequency was always perfectly centered in the designated cell. The data graphed for the graph lines representing the output of the combined FDSP 14 and mode DSP 15 is the data output on data bus 9 and data graphed for the graph lines representing the output of the combined matrix and mode DSPs 12 and 13 is the data output is the data on data bus 7, as shown in FIGS. 1C, 1D, 2A, 2B and 6A-6C. The graph line 210 in the graph in each of FIGS. 8A, 9A and 10A also shows the signal energy and in the graph in each of the FIGS. 8B, 9B and 10B the graph line 211 also shows the noise energy to net input energy ratio (NIR). The ordinate scales and the abscissa scales for all of the graphs in FIGS. 8A, 8B, 9A, 9B, 10A and 10B are such that zero dB corresponds to the nominal input noise energy (equal to the input nominal error energy). For all of the graphs of FIGS. 8A, 8B, 9A, 9B, 10A and 10B, when the signal magnitude is −99 dB, the combined FDSP 14 and mode DSP 15 for Mode 1 has both its measured energy and its error energy at zero dB, as would be predicted. For Mode 1, it can be seen in FIGS. 8A, 8B, 9A, 9B, 10A and 10B that the matrix processing successfully attenuates the noise, thereby substantially improving the sensitivity compared to the combined FDSP and mode DSP non-coherent processing. Specifically, the combined matrix and mode DSP processing for Mode 1 no-signal-present attenuation of the noise (the left-most data point in the graph) is 3.7 dB for a single event, 7.6 dB for eight events, and 13.3 dB for sixty-four events whereas the corresponding combined FDSP and mode DSP processing for Mode 1 values are 0.0, 0.0 and 0.0 dB.

Figure 11:
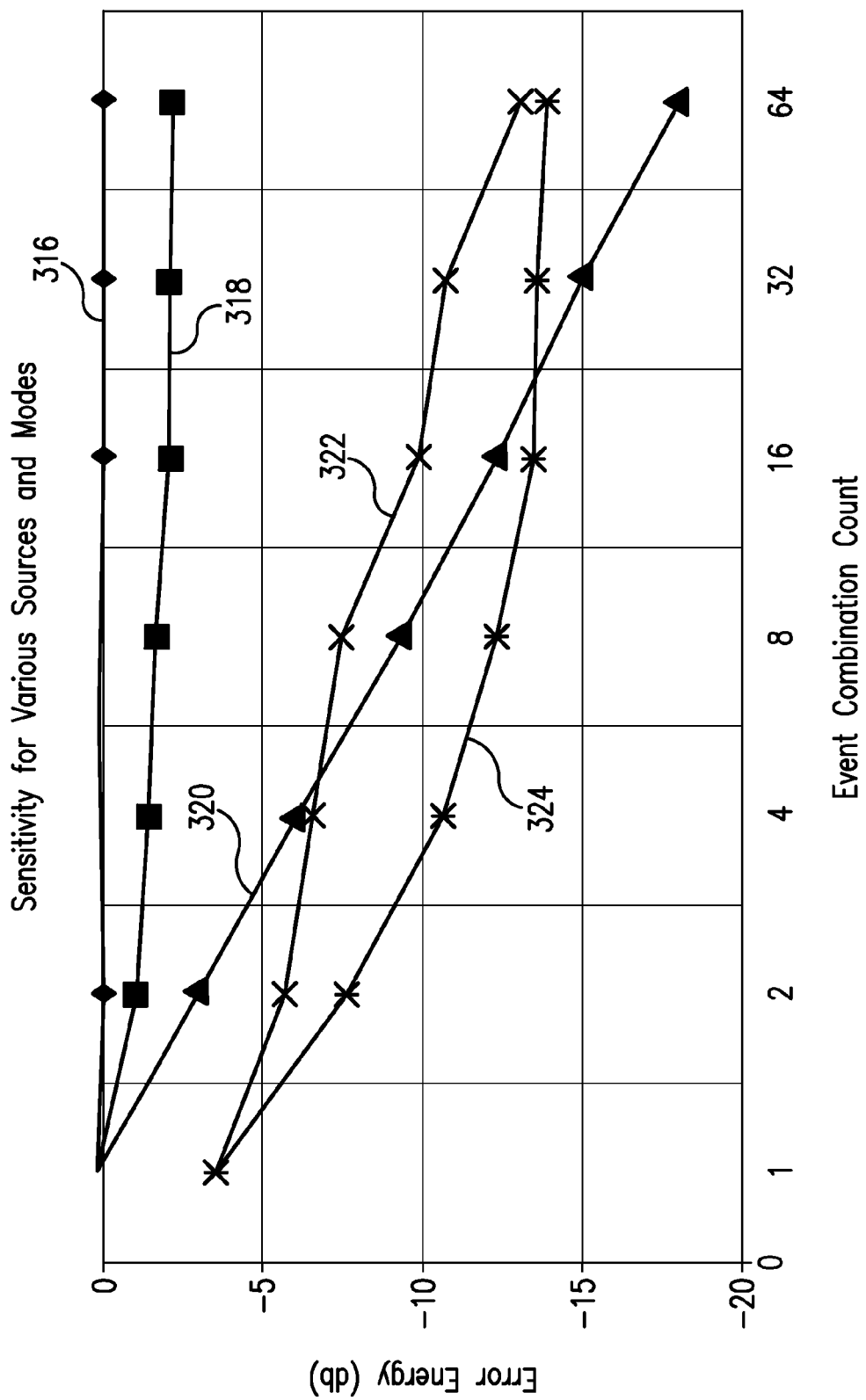
FIG. 11 is a graphical presentation showing the performance of the disclosed system's signal processing compared to conventional processing as a function of the event combination count.

FIG. 11 shows the performance of the disclosed system's signal processing compared to conventional processing as a function of the event combination count. Specifically, the performance for the DSP 15 Mode 1, Mode 2 and Mode 5 processing and the performance for the DSP 13 Mode 1 and Mode 2 processing are shown. FIG. 11 includes the left-most data points in FIGS. 8A, 9A and 10A (for no signal present) and includes additional points for other event-combination counts determined from computer-modeling data. Quantitatively, graph line 322 represents the DSP 13 Mode 1 (the matrix processing simple energy average) performance, where the no-signal-present attenuation of the noise is 3.7 dB for a single event (the left most point of FIG. 8A), 7.6 dB for eight events (the left most point of FIG. 9A), and 13.3 dB for sixty-four events (the left most point of FIG. 10A). Whereas, graph line 316 represents the performance of the corresponding DSP 15 Mode 1 (the Fourier transform processing simple energy average) performance, values (that theoretically are 0.0, 0.0 and 0.0 dB, but with the computer model "Monte-Carlo" statistics approximation) are −0.2, −0.1 and 0.1 dB. Graph line 320 represents the DSP 15 Mode 5 performance, which requires a-priori knowledge of the signal phase. The graph shows that this processing scheme requires a significant number of events to exceed the performance of the DSP 13 matrix processing that does not use a-priori knowledge of the signal phase. Graph line 320 shows that with no signal present, starting at zero dB, noise suppression increases about 3.0 dB more for each doubling of the event combination count, whereas, as graph line 322 shows, the DSP 13 Mode 1 processing starts at 3.7 dB suppression and noise suppression increases about 1.5 dB for each doubling of the event combination count. It can also be seen in FIG. 11, that use of Mode 2 processing improves the performance of both the non-matrix and matrix processing for multiple events, and gives the best results for moderate event-combination counts. Specifically, graph line 318 representing DSP 15 Mode 2 (the Fourier transform processing with "area under the curve" processing) has corresponding noise attenuation values of −0.2 (that theoretically should be 0.0), 1.8 and 2.5 dB, while graph line 324 representing DSP 13 Mode 2 processing (the matrix processing with "area under the curve" processing) has corresponding noise attenuation values of 3.6, 12.4 and 14.1 dB.

As these quantitative values illustrate, the signal processing system and methods described herein do indeed improve the sensitivity of sensors. It does so by matrix processing that exploits information about the white noise outside the designated cell (outside the matched filter bandwidth).

The Mode 2 operation should be calibrated because its curve does not align with the true signal energy curve when there are multiple events unless the signal is quite strong, as shown in FIGS. 9A, 9B, 10A and 10B. Those skilled in signal processing techniques, after examining FIGS. 8A, 8B, 9A, 9B, 10A and 10B, would conclude that a calibrated Mode 2 operation would give excellent performance for all signal input magnitudes and give a monotonic response above −6 dB signal magnitude. That is, the combined matrix and mode DSP processing for Mode 2 that has been calibrated should have much better performance than the combined matrix and mode DSP processing for Mode 1 that does not need calibration.

Further, combining Mode 2 processing with FDSP processing is modestly useful even without matrix processing as can be seen in the above discussion. The performance will also vary as a function of the sampling count N, and thus the performance will vary as a function of the size of the matrix.

Based on the above description, those familiar with signal processing may be able to develop other modes. In particular, a mode allowing negative values of "q" should allow excellent sensitivity for some signal strengths provided a monotonic dynamic range is not an issue or can be dealt with in some manner.

As described above, the signal processing system and methods described herein enhances the sensitivity by linearly attenuating the noise but not the signal in the designated cell. The linear attenuation of the noise in the designated cell is accomplished by exploiting information about the noise available in other frequency domain spectrum cells based on the assumption that these other cells contain white noise exclusively (see FIG. 12). However, when the white noise bandwidth contains unwanted signals such may or may not be a problem. If the unwanted signals are a concern there are methods to eliminate or minimize that signal interference as described in following paragraphs.

In many cases, and especially when the desired signal's modulation rate is relatively low, the required ratio of the white noise bandwidth to the designated cell bandwidth can effectively be achieved when the nearby spectrum is unavailable by using a longer sampling time period and lowering the sampling rate (i.e., keeping N unchanged). While, using a longer sampling time period often allows conventional processing to improve the sensitivity, the enhancement of the disclosed signal processing system adds to the conventional benefit. Alternatively, when this option is unavailable because of the desired signal's modulation rate constraints, the unwanted signals can be deleted, either by using well-known digital processing servo-mechanism techniques, provided the unwanted signals are sufficiently strong and pure, or by simple subtraction provided the unwanted signals are known on an a priori basis, or by a combination of these two techniques, or by other known techniques.

However, the signal processing system and methods described herein can be highly useful when sampling adjustments cannot remove unwanted signals from the required full bandwidth and, for some reason, conventional digital processing techniques cannot deal with unwanted signal interference. For applications that sense and measure electromagnetic propagating signals, as an example, there are potentially three unwanted inputs: free-space noise, front-end noise and nearby unwanted signals. Matching the bandwidth of BPF 22 in the front end (shown in FIG. 2) to the required white noise bandwidth allows the matrix DSP to suppress both the free-space noise and the front-end noise, but leaves it vulnerable to interference from unwanted signals within the white noise bandwidth. Whereas, by matching the BPF 22 bandwidth to the designated cell bandwidth allows the matrix DSP to suppress just the front end noise (not the free-space noise), but avoids interference from unwanted signals. In most cases the primary contributor to the noise intensity is the system's front end, especially for systems of lesser quality with front ends that operate at room temperature and use components with modest noise figures. Therefore, in these common cases the unwanted signals can be filtered out in a way that for all practical purposes does not interfere with the sensitivity enhancement processing of the matrix DSP.

The graphs in FIGS. 8, 9, 10 and 11 show the disclosed system's performance for matrix processing (DSP 15 output), both with and without mode processing (DSP 13 output) for various modes, as well as non-matrix processing (FDSP 14) combined with mode processing (DSP 15 output) for various modes. With reference to FIG. 11, a simplistic interpretation of the FIG. 11 graph curve for the non-matrix Mode 5 (graph line 320) apparently shows, when the vector signal is integrated for a sufficiently large number of events, that this non-matrix coherent-processing performance is better than the performance achieved with matrix processing (graph lines 322 and 324). However, that is not necessarily true because the matrix processing always has superior sensitivity, as will be illustrated in design option examples discussed in following paragraphs. In the following design option examples it is assumed that the total bandwidth and matching clock rate have been predetermined and are fixed, and the signal is coherent, with a constant phase across all the time of interest.

For these conditions the design engineer has the option of implementing matrix processing by treating the input as multiple events, or a single event with finer spectral resolution, or some combination, depending on which choice gives the best performance. For example, instead of the design engineer choosing to use the 8×8 CD×FD matrix eight times for eight samples each for eight events, as illustrated (as an abscissa point) in FIG. 11, the design engineer may choose to "artificially" treat the input as a single event with 64 samples for that one event and use a 64×64 CD×FD matrix.

Although matching the number of single-event samples to the matrix size is the ideal situation, there is another potentially beneficial design option available. The above text has only identified the needed matrix codes for matrix sizes 8×8, 64×64, 512×512 etc. Nevertheless, the option still exists, especially or most easily when the signal phase is constant, for sample sizes not matched to one of these matrix sizes, to choose between treating the input as multiple events or a single event even if the matched-size matrix code remains unknown. Consider the eight-sample 32-event input example illustrated (as an abscissa point) in FIG. 11. This is an unmatched condition where FIG. 11 shows the matrix processing having a disadvantage relative to the non-matrix processing. But, a superior matrix-processing design option results by instead of transforming the time domain samples in groups of eight samples, making eight frequency domain cells for each of the thirty-two events (and using the 8×8 CD×FD matrix processing for each of the thirty-two events). In this scheme, the input is transformed into (32×8=) 256 frequency domain cells. This data can be beneficially processed as a single event with either an 8×8 matrix or a 64×64 matrix. Assuming the latter choice, every fourth cell from this 256 cell spectrum, providing sixty-four equally-spaced frequency-domain cells including the designated cell, is utilized for the 64×64 CD×FD matrix single-event processing. In other words, the data is "artificially" treated as a sixty-four cell single-event input spectrum. The fact that the spectral cell widths are really one-fourth narrower than implied is irrelevant: the average noise energy is reduced (6 dB relative to a true 64-sample spectrum, as desired) but the noise relative statistical variations otherwise remains unchanged, and so the matrix processing provides its usual additional-sensitivity performance.

Although this invention has been described in conjunction with specific forms and embodiments thereof, it will be appreciated that various modifications other than those discussed above may be resorted to without departing from the spirit or scope of the invention. For example, functionally equivalent elements may be substituted for those specifically shown and described, and certain features may be used independently of other features, and in certain cases, particular locations of elements may be reversed or interposed, all without departing from the spirit or scope of the invention as defined in the appended Claims.

What is being claimed is:

1. A system for enhancing sensitivity of a sensor system, comprising:

a front end circuit having an input receiving a signal representing a sensing parameter combined with naturally occurring white noise and outputting an electrical signal corresponding thereto, said front end circuit having a frequency bandwidth N times a matched filter bandwidth for the sensing parameter to be detected by said front end circuit, where N is greater than one; and a digital signal processing unit coupled to said front end circuit for receiving said electrical signal as N sequential samples, said digital signal processing unit including a matrix digital signal processor for applying a transform to said N sequential digital samples using a matrix of N×N cells having an abscissa axis representing equally spaced frequency domain values and an ordinate axis representing code domain values, one of said cells defining a designated cell, said designated cell having a frequency bandwidth and center frequency matched to a frequency bandwidth and center frequency of said signal representing said sensing parameter, said code domain values being established by unique and non-duplicated code constants to provide a transform where a remainder of said plurality of frequency domain cells include frequency domain cells outside said matched filter bandwidth with a common code constant and cells transformed differently with a different code constant, wherein said remainder of said plurality of frequency domain cells are processed to obtain an estimate of signal energy in said designated cell, said matrix digital signal processor providing a filtered output signal representing an energy value of said sensing parameter.

2. The system as recited in claim 1, where said digital signal processing unit includes a mode digital signal processor having an input coupled to said output of said matrix digital signal processor to provide a signal energy estimate for a multiple event sensing parameter.

3. The system as recited in claim 2, where said mode digital signal processor computes an average of multiple energy values output by said matrix digital signal processor during a time period.

4. The system as recited in claim 2, where said mode digital signal processor performs a statistical analysis of multiple energy values output by said matrix digital signal processor during a time period to output a representative energy value.

5. The system as recited in claim 4, where said statistical analysis includes an area under the curve processing method to calculate said representative energy value.

6. The system as recited in claim 2, where said digital signal processing unit further includes a Fourier transform digital signal processor coupled to said front end circuit, and a second mode digital signal processor having an input coupled to an output of said Fourier transform digital signal processor to provide a second signal energy estimate for a multiple event sensing parameter.

7. The system as recited in claim 6, where said second mode digital signal processor computes an average of multiple energy values output by said Fourier transform digital signal processor during a time period.

8. The system as recited in claim 6, where said second mode digital signal performs an area under the curve processing method to output a representative energy value for multiple energy values output by said Fourier transform digital signal processor during a time period.

9. The system as recited in claim 6, where said second mode digital signal processor computes an energy value of an average of multiple vectors output by said Fourier transform digital signal processor during a time period.

10. A system for enhancing sensitivity of a sensor system, comprising:
a front end circuit having an input receiving a signal representing a sensing parameter combined with naturally occurring white noise and outputting an electrical signal corresponding thereto;
an analog-to-digital converter receiving said electrical signal and outputting a digital representation of said electrical signal as N sequential samples, where N is an integer greater than one; and
a digital signal processing unit coupled to said analog-to-digital converter, said digital signal processing unit including a matrix digital signal processor having a transform processor for applying a transform to said N sequential samples using a matrix of N×N cells having an abscissa axis representing equally spaced frequency domain values and an ordinate axis representing code domain values, one of said cells being a designated cell matched to a frequency bandwidth and center frequency of the signal representing the sensing parameter, said code domain values being established by unique and non-duplicated code constants to provide a transform where a remainder of said plurality of cells include frequency domain cells outside said matched filter bandwidth with a common code constant and cells transformed differently with a different code constant, energy of said naturally occurring white noise being distributed in said designated cell and said remainder of the plurality of cells, said matrix digital signal processor using voltage vectors of said naturally occurring white noise distributed in said remainder of the plurality of cells to compensate for energy of said naturally occurring white noise within said designated cell to provide a filtered output signal at an output of said matrix digital signal processor representing an energy value of the sensing parameter.

11. The system as recited in claim 10, where said digital signal processing unit includes a mode digital signal processor having an input coupled to said output of said matrix digital signal processor to provide a signal energy estimate for a multiple event sensing parameter.

12. The system as recited in claim 11, where said mode digital signal processor computes an average of multiple energy values output by said matrix digital signal processor during a time period.

13. The system as recited in claim 11, where said mode digital signal processor performs an area under the curve processing method to output a representative energy value for multiple energy values output by said matrix digital signal processor during a time period.

14. The system as recited in claim 11, where said digital signal processing unit further includes a Fourier transform digital signal processor having an input coupled to said analog-to-digital converter, and a second mode digital signal processor having an input coupled to an output of said Fourier transform digital signal processor to provide a second signal energy estimate for a multiple event sensing parameter.

15. The system as recited in claim 14, where said second mode digital signal processor computes an average of multiple energy values output by said Fourier transform digital signal processor during a time period.

16. The system as recited in claim 14, where said second mode digital signal performs an area under the curve processing method to output a representative energy value for multiple energy values output by said Fourier transform digital signal processor during a time period.

17. The system as recited in claim 14, where said second mode digital signal processor computes an energy value of an average of multiple vectors output by said Fourier transform digital signal processor during a time period.

18. The system as recited in claim 10, where said matrix digital signal processor comprises:
a linear signal energy estimator coupled to an output of said transform processor for calculating an energy estimate for each of a portion of said cells of said matrix; and
a weighted average estimator coupled to said signal energy estimator for combining energy estimates thereof to compute a filtered energy value of said electrical signal.

19. The system as recited in claim 18, where said matrix digital signal processor further comprises a calibration register having an output coupled to both said signal energy estimator and said weighted average estimator for supplying frequency domain samples of a calibration signal thereto.

20. A system for enhancing sensitivity of a receiver system, comprising:

a front end circuit having an antenna coupled to an input thereof receiving naturally occurring white noise and a carrier signal modulated by an information signal and outputting a demodulated electrical signal corresponding to said information signal and said naturally occurring white noise, said front end circuit having a frequency bandwidth N times a matched filter bandwidth for the demodulated electrical signal, where N is greater than one; and a digital signal processing unit coupled to said front end circuit for filtering a digital representation of said demodulated electrical signal as a plurality of frequency domain cells, said digital representation of said demodulated signal being input to said digital signal processing unit as N sequential digital samples, said digital signal processing unit including a matrix digital signal processor having a transform processor for applying a transform to said N sequential digital samples using a matrix of N×N cells having an abscissa axis representing equally spaced frequency domain values and an ordinate axis representing code domain values, one of said cells defining a designated cell, said designated cell having a center frequency and a frequency bandwidth matched to said information signal, said code domain values being established by unique and non-duplicated code constants to provide a transform where a remainder of said plurality of frequency domain cells include frequency domain cells outside said matched filter bandwidth with a common code constant and cells transformed differently with a different code constant, wherein said remainder of said plurality of cells are processed to obtain an estimate of naturally occurring white noise energy in said designated cell to be attenuated and whereby an information signal energy estimate in said designated cell is obtained.

21. The system as recited in claim 20, further comprising an analog-to-digital converter receiving said demodulated electrical signal and outputting a digital representation thereof as said N sequential samples.

22. The system as recited in claim 20, where said digital signal processing unit includes a mode digital signal processor having an input coupled to said output of said matrix digital signal processor to provide a signal energy estimate for a multiple event information signal.

23. The system as recited in claim 22, where said mode digital signal processor computes an average of multiple energy values output by said matrix digital signal processor during a time period.

24. The system as recited in claim 22, where said mode digital signal processor performs an area under the curve processing method to output a representative energy value for multiple energy values output by said matrix digital signal processor during a time period.

25. The system as recited in claim 22, where said digital signal processing unit further includes a Fourier transform digital signal processor having an input coupled to said analog-to-digital converter and a second mode digital signal processor having an input coupled to said output of said Fourier transform digital signal processor to provide a second signal energy estimate for a multiple event information signal.

26. The system as recited in claim 25, where said second mode digital signal processor computes an average of multiple energy values output by said Fourier transform digital signal processor during a time period.

27. The system as recited in claim 25, where said second mode digital signal performs an area under the curve processing method to output a representative energy value for multiple energy values output by said Fourier transform digital signal processor during a time period.

28. The system as recited in claim 25, where said second mode digital signal processor computes an energy value from an average of multiple vector values output by said Fourier transform digital signal processor during a time period.

29. The system as recited in claim 20, where said matrix digital signal processor comprises:
a linear signal energy estimator coupled to an output of said transform processor for calculating an energy estimate for a particular cell of said matrix; and
a weighted average estimator coupled to said signal energy estimator for combining energy estimates thereof from multiple matrix cells to compute a filtered energy value of said electrical signal.

30. The system as recited in claim 29, where said matrix digital signal processor further comprises a calibration register having an output coupled to both said signal energy estimator and said weighted average estimator for supplying frequency domain samples of a calibration signal thereto.

31. A method of enhancing sensitivity of a sensor system comprising the steps of:
providing a sensor system having a frequency bandwidth N times a matched filter bandwidth for an input signal to be detected by the sensor system, where N is greater than one;
sensing the input signal and naturally occurring white noise at an input of the sensor system and providing an electrical signal representation thereof at an output of the sensor system;
providing a digital signal processor to filter the electrical signal as a plurality of frequency domain cells and receiving said electrical signal as N sequential digital samples, the digital signal processor including a matrix digital signal processor for applying a transform to said N sequential digital samples using a matrix of N×N cells having an abscissa axis representing equally spaced frequency domain values and an ordinate axis representing code domain values, one of said cells defining a designated cell, the designated cell having a center frequency and a frequency bandwidth matched to the input signal, said code domain values being established by unique and non-duplicated code constants to provide a transform where a remainder of said plurality of frequency domain cells include frequency domain cells outside said matched filter bandwidth with a common code constant and cells transformed differently with a different code constant;
processing said remainder of said plurality of frequency domain cells to obtain an estimate of naturally occurring white noise and information signal energy in the designated cell and the remainder of said plurality of frequency domain cells; and
compensating for the naturally occurring white noise in the designated cell using the estimate of naturally occurring white noise energy established from the remainder of the plurality of frequency domain cells.

32. A method of enhancing sensitivity of a sensor system comprising the steps of:
sensing a sensing parameter combined with naturally occurring white noise and conversion thereof to an electrical signal;
converting said electrical signal in an analog-to-digital converter to a digital representation thereof as N sequential samples, where N is an integer greater than one;
filtering at least a portion of the naturally occurring white noise from said digital representation of said electrical signal to provide a signal representing the sensing parameter in a matrix digital signal processing unit, said filtering including:
a. using a transform processor to apply a transform to said N sequential samples for converting said samples to an N×N matrix, said matrix having an abscissa axis representing equally spaced frequency domain values and an ordinate axis representing code domain values, one of said cells defining a designated cell, said designated cell having a center frequency and a frequency bandwidth matched to the input signal, said code domain values being established by unique and non-duplicated code constants to provide a transform where a remainder of said plurality of frequency domain cells include frequency domain cells outside said matched filter bandwidth with a common code constant and cells transformed differently with a different code constant; and
b. processing said matrix to calculate voltage vectors of said naturally occurring white noise external to a bandwidth of said sensing parameter and using said calculated white noise voltage vectors to compensate for energy of said naturally occurring white noise within said bandwidth of said sensing parameter.

33. A system for enhancing sensitivity of a sensor system to an input signal comprising at least one signal processor configured to use data corresponding to naturally occurring white noise in a frequency spectrum external to a frequency bandwidth of the input signal to attenuate naturally occurring white noise within said frequency bandwidth of the input signal, said at least one signal processor including a matrix digital signal processor for applying a transform to N sequential digital frequency domain samples using a matrix of N×N cells having an abscissa axis representing equally spaced frequency domain values and an ordinate axis representing code domain values, one of said cells defining a designated cell, the designated cell having a center frequency and a frequency bandwidth matched to the input signal, said code domain values being established by unique and non-duplicated code constants to provide a transform where a remainder of said plurality of frequency domain cells include frequency domain cells outside said matched filter bandwidth with a common code constant and cells transformed differently with a different code constant.

34. The system as recited in claim 33, where said matrix digital signal processor comprises:
a linear signal energy estimator coupled to an output of said transform processor for calculating an energy estimate for each of a portion of said cells of said matrix; and
a weighted average estimator coupled to said signal energy estimator for combining energy estimates thereof to compute a filtered energy value of an electrical signal corresponding to said input signal.

* * * * *